(12) United States Patent
Tang et al.

(10) Patent No.: US 8,325,429 B2
(45) Date of Patent: Dec. 4, 2012

(54) PHOTOGRAPHING OPTICAL LENS ASSEMBLY

(75) Inventors: Hsiang-Chi Tang, Taichung (TW); Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 50 days.

(21) Appl. No.: 13/154,460

(22) Filed: Jun. 7, 2011

(65) Prior Publication Data
US 2012/0162784 A1 Jun. 28, 2012

(30) Foreign Application Priority Data
Dec. 23, 2010 (TW) .............................. 99145566 A

(51) Int. Cl.
*G02B 9/60* (2006.01)
*G02B 3/02* (2006.01)
(52) U.S. Cl. ......... 359/714; 359/764; 359/765; 348/335
(58) Field of Classification Search .................. 359/708, 359/713, 714, 754–758, 763–766; 348/240.99–240.3, 335–369; 396/72–88
See application file for complete search history.

(56) References Cited

U.S. PATENT DOCUMENTS

| 4,204,747 A * | 5/1980 | Imai ............................... 359/746 |
| 2001/0022698 A1* | 9/2001 | Sato .............................. 359/733 |
| 2011/0013069 A1* | 1/2011 | Chen ............................. 348/335 |

* cited by examiner

*Primary Examiner* — Darryl J Collins
(74) *Attorney, Agent, or Firm* — CKC & Partners Co., Ltd.

(57) ABSTRACT

A photographing optical lens assembly includes, in order from an object side to an image side: a first lens element with positive refractive power, a second lens element with negative refractive power having a convex object-side surface and a concave image-side surface, a third lens element having a concave image-side surface, wherein at least one of the object-side surface and the image-side surface of the third lens element is aspheric, a fourth lens element with positive refractive power having a convex image-side surface, wherein at least one of the object-side surface and the image-side surface of the fourth lens element is aspheric, and a fifth lens element with negative refractive power having a concave image-side surface, wherein at least one of the object-side surface and the image-side surface of the fifth lens element is aspheric.

22 Claims, 14 Drawing Sheets

PHOTOGRAPHING OPTICAL LENS ASSEMBLY

RELATED APPLICATIONS

The application claims priority to Taiwan Application Serial Number 099145566, filed Dec. 23, 2010, which is herein incorporated by reference.

BACKGROUND

1. Field of Invention

The present invention relates to a photographing optical lens assembly. More particularly, the present invention relates to a compact photographing optical lens assembly applicable to electronic products.

2. Description of Related Art

In recent years, with the popularity of mobile products with camera functionalities, the demand for compact photographing lenses is increasing, and the sensor of a conventional photographing camera is none other than CCD (Charge Coupled Device) or CMOS (Complementary Metal-Oxide Semiconductor Sensor). Furthermore, as advanced semiconductor manufacturing technology has allowed the pixel size of sensors to be reduced and compact photographing lenses have gradually evolved toward higher megapixels, there is an increasing demand for compact photographing lenses featuring better image quality.

A conventional compact photographing lens assembly applied on a portable electronic product mainly adopts a four-element lens structure. Due to the popularity of high specification mobile products, such as smart phones and PDAs (Personal Digital Assistants), the requirements of pixels and image quality of the compact photographing lens assembly increase rapidly. However, the conventional four-piece lens structure cannot satisfy the requirements of the compact photographing lens assembly. Furthermore, the trend of modern electronics gradually moves toward high performance and compact size. Therefore, a need exists in the art for providing a photographing lens assembly having excellent imaging quality without a long total track length for portable mobile electronics.

SUMMARY

The present invention provides a photographing optical lens assembly including, in order from an object side to an image side: a first lens element, a second lens element, a third lens element, a fourth lens element and a fifth lens element. The first lens element is with positive refractive power. The second lens element with negative refractive power has a convex object-side surface and a concave image-side surface. The third lens element has a concave image-side surface, wherein at least one of an object-side surface and the image-side surface of the third lens element is aspheric. The fourth lens element with positive refractive power has a convex image-side surface, wherein at least one of an object-side surface and the image-side surface of the fourth lens element is aspheric. The fifth lens element with negative refractive power has a concave image-side surface, wherein at least one of an object-side surface and the image-side surface of the fifth lens element is aspheric. A focal length of the fourth lens element is f4. A focal length of the photographing optical lens assembly is f. A curvature radius of the object-side surface of the second lens element is R3. A curvature radius of the image-side surface of the third lens element is R6. A curvature radius of the object-side surface of the fourth lens element is R7. f4, f, R3, R6 and R7 satisfy the following relationships:

$$0.3 < f4/f < 0.8;$$

$$0.3 < f/R3 < 2.0; \text{ and}$$

$$0.0 < f/(R6-R7) < 0.5.$$

According to another aspect of the present invention, a photographing optical lens assembly including, in order from an object side to an image side: a first lens element, a second lens element, a third lens element, a fourth lens element and a fifth lens element. The first lens element is with positive refractive power. The second lens element is with negative refractive power has a concave image-side surface. The third lens element has a concave image-side surface, wherein at least one of an object-side surface and the image-side surface of the third lens element is aspheric. The fourth lens element with positive refractive power has a convex image-side surface, wherein at least one of an object-side surface and the image-side surface of the fourth lens element is aspheric. The fifth lens element with negative refractive power has a concave image-side surface, wherein at least one of an object-side surface and the image-side surface of the fifth lens element is aspheric. A focal length of the fourth lens element is f4. A focal length of the photographing optical lens assembly is f. A curvature radius of the image-side surface of the second lens element is R4. A curvature radius of the object-side surface of the fourth lens element is R7. A curvature radius of the image-side surface of the fourth lens element is R8. A thickness near the optical axis of the fourth lens element is CT4. An axial distance between the third lens element and the fourth lens element is T34. f4, f, R4, R7, R8, CT4 and T34 satisfy the following relationships:

$$0.3 < f4/f < 0.8;$$

$$1.3 < f/R4 < 3.8;$$

$$1.4 < (R7+R8)/(R7-R8) < 3.0; \text{ and}$$

$$1.6 < CT4/T34 < 18.0.$$

DETAILED DESCRIPTION

Figure 1:
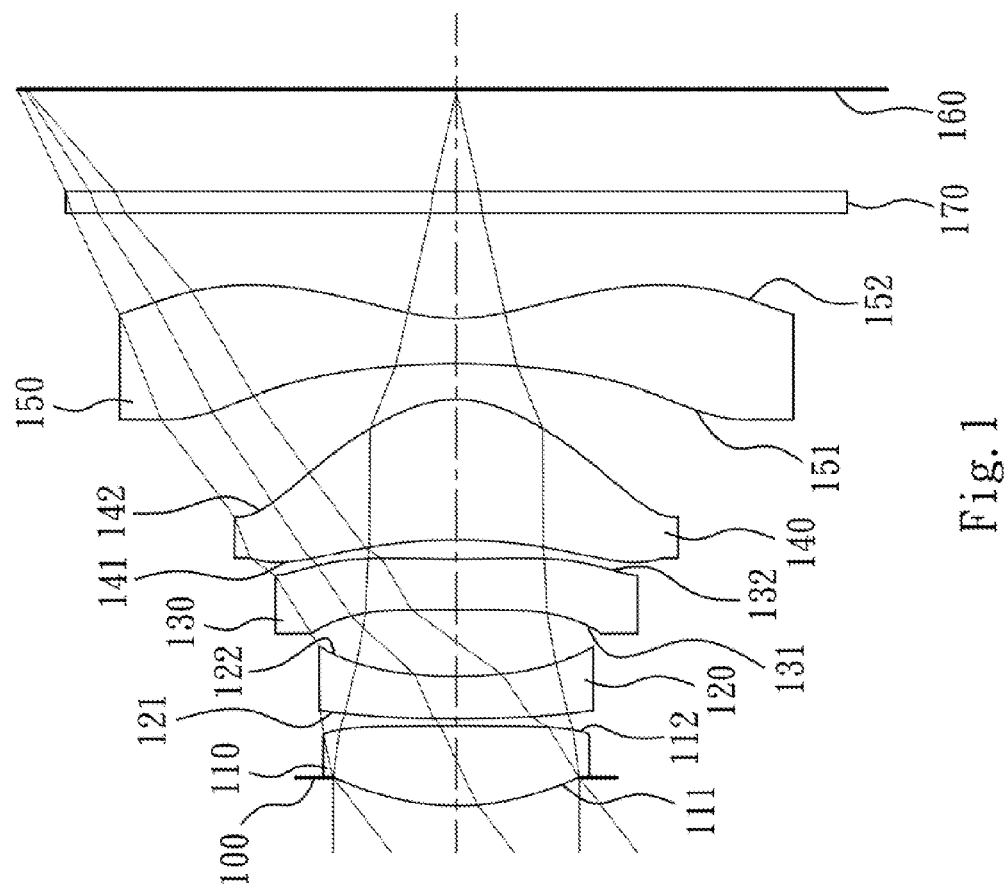
FIG. 1 is a schematic view of a photographing optical lens assembly according to the first embodiment.

A photographing optical lens assembly includes, in order from an object side to an image side, a first lens element, a second lens element, a third lens element, a fourth lens element and a fifth lens element. The photographing optical lens assembly further includes an image sensor located on an image plane.

The first lens element with positive refractive power provides partial refractive power for reducing the total track length of the photographing optical lens assembly.

The second lens element with negative refractive power can effectively correct the aberration generated from the first lens element and meanwhile advantageously correct the chromatic aberration within the optical system. The second lens element has a convex object-side surface and a concave image-side surface, so that the aberration of the photographing optical lens assembly can be further corrected.

The third lens element has a concave image-side surface, so that the back focal length of the photographing optical lens assembly can be enhanced for setting other elements. At least one of the object-side surface and the image-side surface of the third lens element is aspheric. Furthermore, the third lens element can with negative refractive power for reducing the photosensitivity generated from the second lens element.

The fourth lens element with positive refractive power reduces the photosensitivity of the photographing optical lens assembly by cooperate with the first lens element which with positive refractive power. The fourth lens element has a convex image-side surface for correcting the chromatic aberration. At least one of the object-side surface and the image-side surface of the fourth lens element is aspheric.

The fifth lens element with negative refractive power corrects the Petzval Sum of the photographing optical lens assembly for smoothing the peripheral area of the image. The fifth lens element has a concave image-side surface, so that the principal point of the photographing optical lens assembly can be positioned away from the image plane, and the total track length of the photographing optical lens assembly can be reduced so as to maintain the compact size of the photographing optical lens assembly. At least one of the object-side surface and the image-side surface of the fifth lens element is aspheric. Furthermore, the fifth lens element has at least one inflection point formed on at least one of the object-side surface and the image-side surface thereof. Therefore, the incident angle of the off-axis field of light on the image sensor can be efficiently restrained and the aberration of the off-axis field can be corrected.

A focal length of the photographing optical lens assembly is f, a focal length of the fourth lens element is f4, and they satisfy the following relationship:

$0.3 < f4/f < 0.8.$

Therefore, the fourth lens element provides positive refractive power for reducing the total track length of the photographing optical lens assembly.

f and f4 can further satisfy the following relationship:

$0.3 < f4/f < 0.55.$

The focal length of the photographing optical lens assembly is f, a curvature radius of the object-side surface of the second lens element is R3, and they satisfy the following relationship:

$0.3 < f/R3 < 2.0.$

Therefore, the curvature of the object-side surface of the second lens element can correct the astigmatism of the photographing optical lens assembly.

f and R3 can further satisfy the following relationship:

$0.35 < f/R3 < 1.5.$

The focal length of the photographing optical lens assembly is f, a curvature radius of the image-side surface of the third lens element is R6, a curvature radius of the object-side surface of the fourth lens element is R7, and they satisfy the following relationship:

$0.0 < f/(R6 - R7) < 0.5.$

When the above relation is satisfied, the total track length can be reduced by the curvature of the image-side surface of the third lens element and the object-side surface of the fourth lens element.

The Abbe number of the first lens element is V1, the Abbe number of the second lens element is V2, and they satisfy the following relationship:

$26 < V1 - V2 < 40.$

Therefore, the chromatic aberration of the photographing optical lens assembly can be corrected.

The curvature radius of the object-side surface of the fourth lens element is R7, a curvature radius of the image-side surface of the fourth lens element is R8, and they satisfy the following relationship:

$1.4 < (R7 + R8)/(R7 - R8) < 3.0.$

When the above relation is satisfied, the astigmatism of the photographing optical lens assembly can be corrected by the curvature of the object-side surface and the image-side surface of the fourth lens element.

R7 and R8 can further satisfy the following relationship:

$1.5 < (R7 + R8)/(R7 - R8) < 2.2.$

The focal length of the fifth lens element is f5, the focal length of the photographing optical lens assembly is f, and they satisfy the following relationship:

$-0.6 < f5/f < -0.25.$

Therefore, the refractive power of the fifth lens element can correct the aberration generated from the fourth lens element.

An axial distance between the first lens element and the second lens element is T12, an axial distance between the second lens element and the third lens element is T23, and they satisfy the following relationship:

$0.0 < T12/T23 < 0.5.$

Therefore, the lens elements can be installed easier by the arrangement of the second lens element.

The photographing optical lens assembly further includes a stop, which can be an aperture stop. An axial distance between the stop and the image plane is SL, an axial distance between the object-side surface of the first lens element and the image plane is TTL, and they satisfy the following relationship:

$$0.7 < SL/TTL < 1.1.$$

When the SL/TTL<0.7, the angle of incidence on the image sensor would be too large, which will cause poor photographic performance of the image sensor as well as too much chromatic aberration within the photographing optical lens assembly. When the SL/TTL>1.1, the total track length of the photographing optical lens assembly would be too long. Therefore, when SL/TTL satisfies the above relationship, the photographing optical lens assembly has the telecentric or wide-angle characteristic, and a desirable total track length of the photographing optical lens assembly can be maintained.

A half of a diagonal length of an effective photosensitive area of the image sensor is ImgH, and the axial distance between the object-side surface of the first lens element and the image plane is TTL, and they satisfy the following relationship:

$$TTL/ImgH < 1.85.$$

When the above relation is satisfied, the total track length of the photographing optical lens assembly can be reduced, so as to maintain the compact size of the photographing optical lens assembly for applications on lightweight and portable electronic products.

The focal length of the photographing optical lens assembly is f, the focal length of the fourth lens element is f4, a focal length of the fifth lens element is f5, and they satisfy the following relationship:

$$3.0 < (f/f4) - (f/f5) < 6.0.$$

Therefore, the refractive power of the fourth lens element and fifth lens element can reduce the total track length of the photographing optical lens assembly and avoid producing too much aberration.

A thickness near the optical axis of the fourth lens element is CT4, an axial distance between the third lens element and the fourth lens element is T34, and they satisfy the following relationship:

$$1.6 < CT4/T34 < 18.0.$$

Therefore, the arrangement of the fourth lens element can reduce the total track length of the photographing optical lens assembly.

CT4 and T34 can further satisfy the following relationship:

$$3.2 < CT4/T34 < 12.5.$$

The focal length of the photographing optical lens assembly is f, a curvature radius of the image-side surface of the second lens element is R4, and they satisfy the following relationship:

$$1.3 < f/R4 < 3.8.$$

Therefore, the curvature of the image-side surface of the second lens element can correct the aberration of the photographing optical lens assembly.

A thickness near the optical axis of the second lens element is CT2, a thickness near the optical axis of the third lens element is CT3, the focal length of the photographing optical lens assembly is f, and they satisfy the following relationship:

$$0.8 < ((CT2+CT3)/f)*10 < 2.0.$$

Therefore, the thickness of the second lens element and the third lens element can reduce the total track length of the photographing optical lens assembly.

The curvature radius of the object-side surface of the second lens element is R3, the curvature radius of the image-side surface of the second lens element is R4, and they satisfy the following relationship:

$$0.0 < R4/R3 < 0.5.$$

When the above relation is satisfied, the spherical aberration of the photographing optical lens assembly can be corrected.

According to the photographing optical lens assembly of the present invention, the lens element can be made of glass material or plastic material. When the lens element is made of glass material, the distribution of degree of freedom of the refractive power of the photographing optical lens assembly can be increased. When the lens element is made of plastic material, the cost of manufacture can be effectively reduced. Besides, the surface of the lens element can be aspheric, so as to make the surface into other shape except spherical easier for obtaining more controllable variable, reducing aberration and amount of the lens element. Therefore, the total track length of the photographing optical lens assembly can be reduced.

According to the photographing optical lens assembly of the present invention, the lens element has a convex surface representing the paraxial region of the surface is convex, and the lens element has a concave surface representing the paraxial region of the surface is concave.

According to the photographing optical lens assembly of the present invention, the photographing optical lens assembly can include at least one diaphragm for reducing stray light while retaining high image quality.

According to the above description of the present invention, the following 1st-7th specific embodiments are provided for further explanation.

Figure 2:
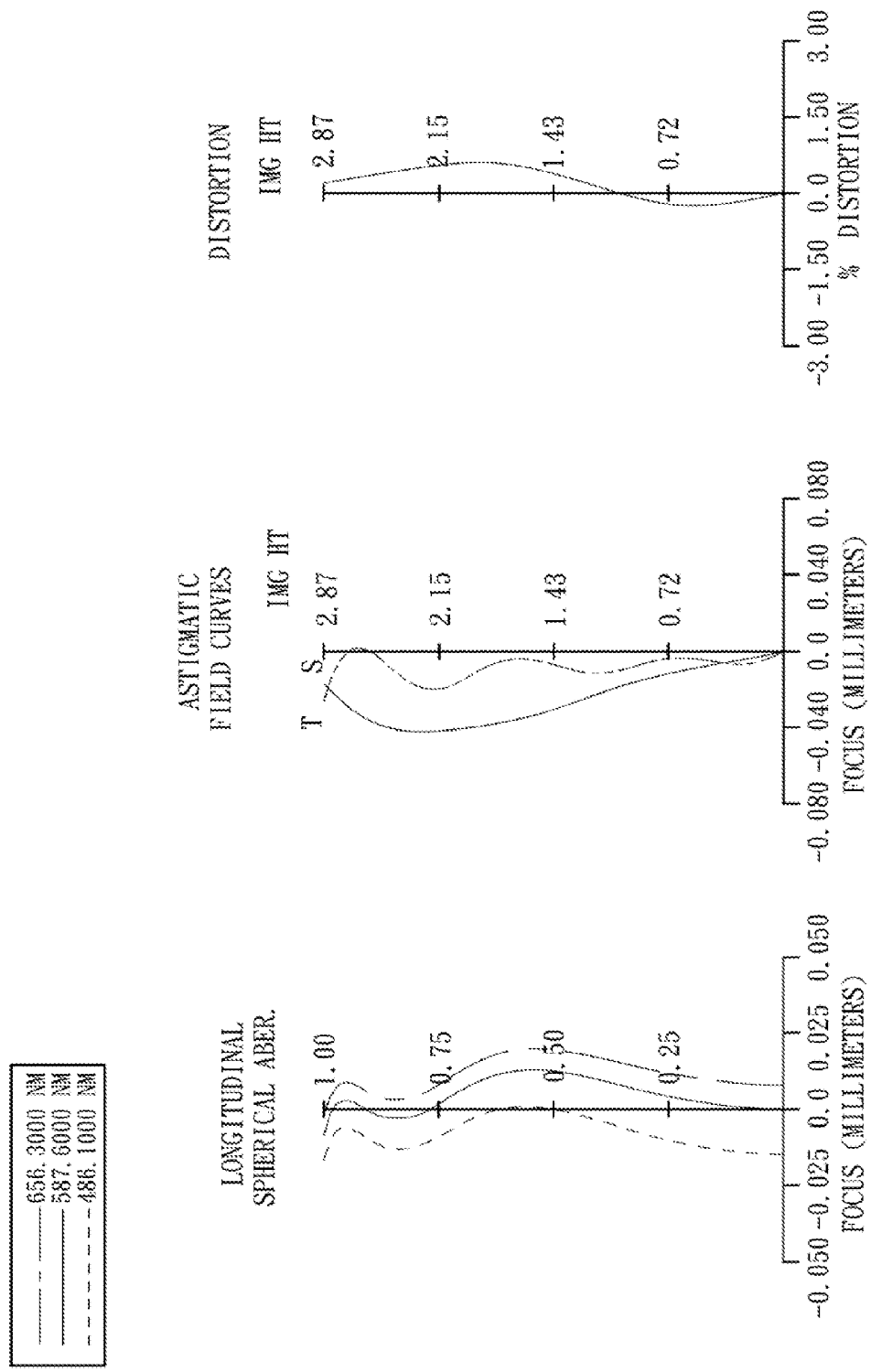
FIG. 2 shows spherical aberration curves, astigmatic field curves and distortion curve of the photographing optical lens assembly according to the first embodiment.

FIG. 1 is a schematic view of a photographing optical lens assembly according to the first embodiment. FIG. 2 shows spherical aberration curves, astigmatic field curves and distortion curve of the photographing optical lens assembly according to the first embodiment. In FIG. 1, the photographing optical lens assembly includes, in order from an object side to an image side, an aperture stop 100, the first lens element 110, the second lens element 120, the third lens element 130, the fourth lens element 140, the fifth lens element 150, an IR (infrared) cut filter 170 and an image plane 160.

The first lens element 110 is made of plastic material. The first lens element 110 with positive refractive power has a convex object-side surface 111 and a convex image-side surface 112. The object-side surface 111 and the image-side surface 112 of the first lens element 110 are aspheric.

The second lens element 120 is made of plastic material. The second lens element 120 with negative refractive power has a convex object-side surface 121 and a concave image-side surface 122. The object-side surface 121 and the image-side surface 122 of the second lens element 120 are aspheric.

The third lens element 130 is made of plastic material. The third lens element 130 with negative refractive power has a convex object-side surface to 131 and a concave image-side surface 132. The object-side surface 131 and the image-side surface 132 of the third lens element 130 are aspheric.

The fourth lens element 140 is made of plastic material. The fourth lens element 140 with positive refractive power has a concave object-side surface 141 and a convex image-side surface 142. The object-side surface 141 and the image-side surface 142 of the fourth lens element 140 are aspheric.

The fifth lens element 150 is made of plastic material. The fifth lens element 150 with negative refractive power has a concave object-side surface 151 and a concave image-side surface 152. The object-side surface 151 and the image-side surface 152 of the fifth lens element 150 are aspheric. The fifth lens element 150 has inflection points formed on the image-side surface 152 thereof.

The IR cut filter 170 is made of glass and is located between the fifth lens element 150 and the image plane 160, and will not affect the focal length of the photographing optical lens assembly.

The equation of the aspheric surface profiles of the aforementioned lens elements of the first embodiment is expressed as follows:

$$X(Y) = (Y^2/R)/(1 + sqrt(1 - (1+k) \times (Y/R)^2)) + \sum_i (Ai) \times (Y^i)$$

wherein:

X: the height of a point on the aspheric surface spaced at a distance Y from the optical axis relative to the tangential plane at the aspheric surface vertex;

Y: the distance from the point on the curve of the aspheric surface to the optical axis;

k: the conic coefficient; and

Ai: the i-th aspheric coefficient.

In the photographing optical lens assembly according to the first embodiment, f is a focal length of the photographing optical lens assembly, Fno is an f-number of the photographing optical lens assembly, HFOV is half of the maximal field of view, and they satisfy the following relationships:

$f=3.73$ mm;

$Fno=2.27$; and $HFOV=37.6$ degrees.

In the photographing optical lens assembly according to the first embodiment, the Abbe number of the first lens element 110 is V1, the Abbe number of the second lens element 120 is V2, and they satisfy the following relationship:

$V1-V2=32.1$.

In the photographing optical lens assembly according to the first embodiment, the focal length of the photographing optical lens assembly is f, the focal length of the fourth lens element 140 is f4, the focal length of the fifth lens element 150 is f5, and they satisfy the following relationships:

$f4/f=0.40$;

$f5/f=-0.41$; and $(f/f4)-(f/f5)=4.93$.

In the photographing optical lens assembly according to the first embodiment, the focal length of the photographing optical lens assembly is f, to the curvature radius of the object-side surface 121 of the second lens element 120 is R3, the curvature radius of the image-side surface 122 of the second lens element 120 is R4, the curvature radius of the image-side surface 132 of the third lens element 130 is R6, the curvature radius of the object-side surface 141 of the fourth lens element 140 is R7, the curvature radius of the image-side surface 142 of the fourth lens element 140 is R8, and they satisfy the following relationships:

$f/R3=0.42$;

$f/R4=1.42$;

$f/(R6-7)=0.24$;

$R4/R3=0.29$; and $(R7+R8)/(R7-R8)=1.51$.

In the photographing optical lens assembly according to the first embodiment, the focal length of the photographing optical lens assembly is f, the thickness near the optical axis of the second lens element 120 is CT2, the thickness near the optical axis of the third lens element 130 is CT3, the thickness near the optical axis of the fourth lens element 140 is CT4, the axial distance between the first lens element 110 and the second lens element 120 is T12, the axial distance between the second lens element 120 and the third lens element 130 is T23, the axial distance between the third lens element 130 and the fourth lens element 140 is T34, and they satisfy the following relationships:

$((CT2+CT3)/f)*10=1.67$;

$CT4/T34=7.14$; and $T12/T23=0.11$.

In the photographing optical lens assembly according to the first to embodiment, the axial distance between the aperture stop 100 and the image plane 160 is SL, the axial distance between the object-side surface 111 of the first lens element 110 and the image plane 160 is TTL, a half of a diagonal length of an effective photosensitive area of the image sensor is ImgH, and they satisfy the following relationships:

$SL/TTL=0.96$; and $TTL/ImgH=1.64$.

The detailed optical data of the first embodiment are shown in Table 1, and the aspheric surface data are shown in Table 2 as follows.

TABLE 1

1st Embodiment
f = 3.73 mm, Fno = 2.27, HFOV = 37.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.190 | | | | |
| 2 | Lens 1 | 1.692940 (ASP) | 0.532 | Plastic | 1.544 | 55.9 | 3.04 |
| 3 | | −60.471700 (ASP) | 0.047 | | | | |
| 4 | Lens 2 | 8.949500 (ASP) | 0.282 | Plastic | 1.634 | 23.8 | −5.96 |
| 5 | | 2.623140 (ASP) | 0.442 | | | | |
| 6 | Lens 3 | 58.084600 (ASP) | 0.339 | Plastic | 1.634 | 23.8 | −24.48 |

TABLE 1-continued

1st Embodiment
f = 3.73 mm, Fno = 2.27, HFOV = 37.6 deg.

| Surface # | | Curvature Radius | Thickness | Material | Index | Abbe # | Focal length |
|---|---|---|---|---|---|---|---|
| 7 | | 12.221700 (ASP) | 0.131 | | | | |
| 8 | Lens 4 | −3.552000 (ASP) | 0.935 | Plastic | 1.544 | 55.9 | 1.48 |
| 9 | | −0.717070 (ASP) | 0.235 | | | | |
| 10 | Lens 5 | −3.942100 (ASP) | 0.301 | Plastic | 1.544 | 55.9 | −1.54 |
| 11 | | 1.091840 (ASP) | 0.700 | | | | |
| 12 | IR-filter | Plano | 0.145 | Glass | 1.517 | 64.2 | — |
| 13 | | Plano | 0.682 | | | | |
| 14 | Image | Plano | — | | | | |

Note:
Reference wavelength (d-line) is 587.6 nm

TABLE 2

Aspheric Coefficients

| Surface # | 2 | 3 | 4 | 5 | 6 |
|---|---|---|---|---|---|
| k = | −8.10665E+00 | 9.00000E+01 | 6.48580E+01 | 4.57514E+00 | −7.70066E+01 |
| A4 = | 1.91928E−01 | −3.26738E−02 | −2.12839E−02 | −2.22541E−02 | −1.38774E−01 |
| A6 = | −2.01628E−01 | 6.56168E−03 | 2.17279E−02 | 3.33441E−02 | −2.00667E−01 |
| A8 = | 1.31541E−01 | −1.68746E−01 | 2.06424E−01 | 1.19447E−01 | 2.84994E−01 |
| A10 = | −1.43715E−02 | 3.32806E−01 | −6.78007E−01 | −3.39959E−01 | −2.01060E−01 |
| A12 = | −7.72332E−02 | −3.65876E−01 | 7.71699E−01 | 3.08811E−01 | 7.19074E−02 |
| A14 = | −1.73849E−02 | 1.01183E−01 | −3.11666E−01 | −9.18589E−02 | |

| Surface # | 7 | 8 | 9 | 10 | 11 |
|---|---|---|---|---|---|
| k = | 4.45761E+01 | 5.13714E+00 | −3.14668E+00 | −9.00000E+01 | −9.45096E+00 |
| A4 = | −6.97096E−02 | −1.30036E−02 | −1.59097E−01 | −2.23063E−02 | −5.46264E−02 |
| A6 = | −1.29208E−01 | 9.63682E−02 | 1.18024E−01 | −1.95960E−02 | 1.36969E−02 |
| A8 = | 1.23307E−01 | −1.70331E−01 | −8.03592E−02 | 8.87509E−03 | −3.91174E−03 |
| A10 = | −4.29266E−02 | 1.95467E−01 | 4.51890E−02 | −5.18297E−04 | 9.21213E−04 |
| A12 = | 1.00218E−02 | −9.62172E−02 | −9.64788E−03 | −1.22345E−04 | −1.34266E−04 |
| A14 = | | 1.77806E−02 | 4.43635E−04 | 1.07831E−05 | 8.91550E−06 |

In Table 1, the curvature radius, the thickness and the focal length are shown in millimeters (mm). Surface number 0-14 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th. All labels for Tables of the remaining embodiments share the same definitions as those in Table 1 and Table 2 of the first embodiment, and their definitions will not be stated again.

Figure 3:
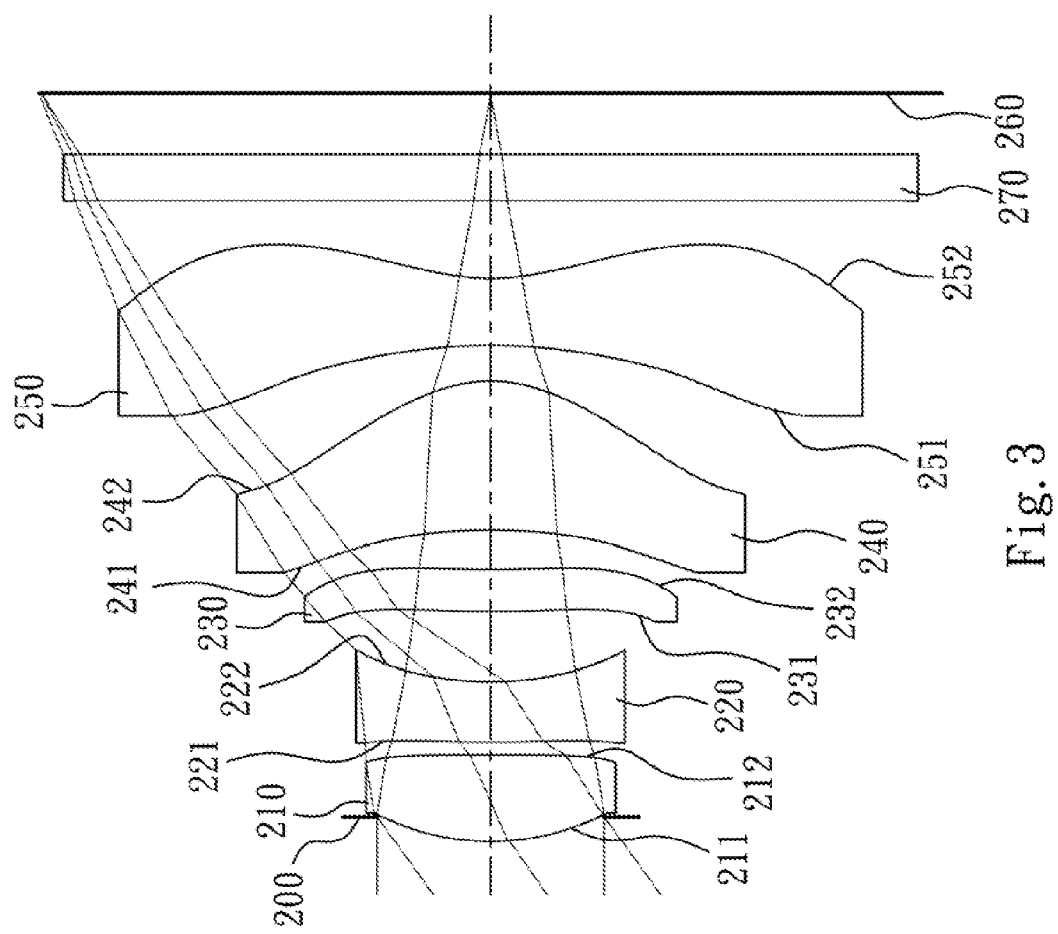
FIG. 3 is a schematic view of a photographing optical lens assembly according to the second embodiment.
Figure 4:
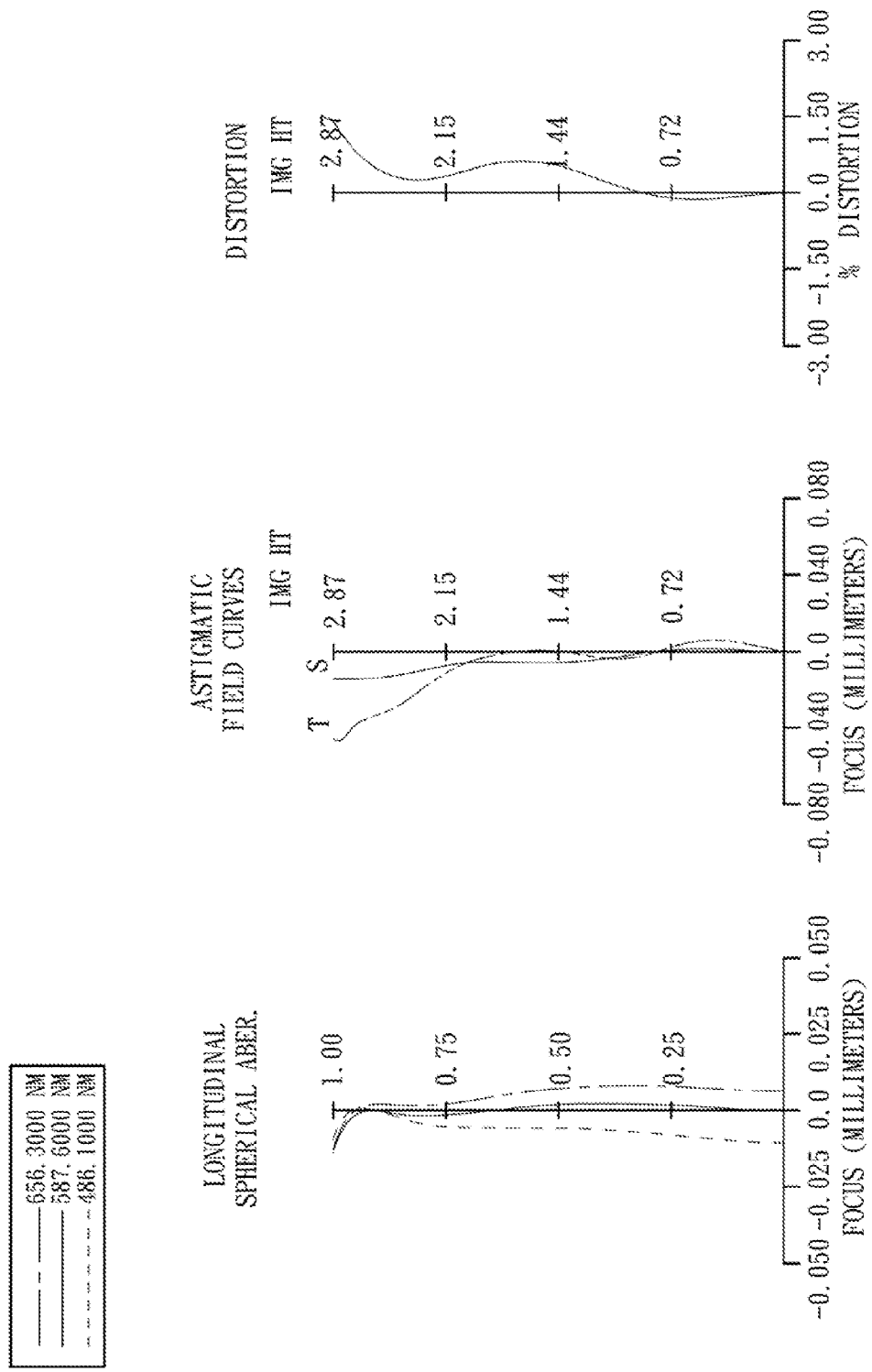
FIG. 4 shows spherical aberration curves, astigmatic field curves and distortion curve of the photographing optical lens assembly according to the second embodiment.

FIG. 3 is a schematic view of a photographing optical lens assembly according to the second embodiment. FIG. 4 shows spherical aberration curves, astigmatic field curves and distortion curve of the photographing optical lens assembly according to the second embodiment. In FIG. 3, the photographing optical lens assembly includes, in order from an object side to an image side, an aperture stop 200, the first lens element 210, the second lens element 220, the third lens element 230, the fourth lens element 240, the fifth lens element 250, an IR (infrared) cut filter 270 and an image plane 260.

The first lens element 210 is made of plastic material. The first lens element 210 with positive refractive power has a convex object-side surface 211 and a convex image-side surface 212. The object-side surface 211 and the image-side surface 212 of the first lens element 210 are aspheric.

The second lens element 220 is made of plastic material. The second lens element 220 with negative refractive power has a convex object-side surface 221 and a concave image-side surface 222. The object-side surface 221 and the image-side surface 222 of the second lens element 220 are aspheric.

The third lens element 230 is made of plastic material. The third lens element 230 with positive refractive power has a convex object-side surface 231 and a concave image-side surface 232. The object-side surface 231 and the image-side surface 232 of the third lens element 230 are aspheric.

The fourth lens element 240 is made of plastic material. The fourth lens element 240 with positive refractive power has a concave object-side surface 241 and a convex image-side surface 242. The object-side surface 241 and the image-side surface 242 of the fourth lens element 240 are aspheric.

The fifth lens element 250 is made of plastic material. The fifth lens element 250 with negative refractive power has a concave object-side surface 251 and a concave image-side surface 252. The object-side surface 251 and the image-side surface 252 of the fifth lens element 250 are aspheric. The fifth lens element 250 has inflection points formed on the image-side surface 252 thereof.

The IR cut filter 270 is made of glass and is located between the fifth lens element 250 and the image plane 260, and will not affect the focal length of the photographing optical lens assembly.

The equation of the aspheric surface profiles of the above lens elements of the second embodiment is the same as that of the first embodiment, and will not be stated herein again.

In the photographing optical lens assembly according to the second embodiment, the definitions of f, Fno, HFOV, V1, V2, f4, f5, R3, R4, R6, R7, R8, CT2, CT3, CT4, T12, T23, T34, SL, TTL and ImgH are the same as those stated in the first embodiment with corresponding values for the second embodiment, and they satisfy the following relationships:

| | |
|---|---|
| f(mm) | 3.95 |
| Fno | 2.70 |
| HFOV(degrees) | 35.8 |
| V1 − V2 | 32.1 |
| f4/f | 0.46 |
| f5/f | −0.40 |
| (f/f4) − (f/f5) | 4.67 |
| f/R3 | 0.40 |
| f/R4 | 1.85 |
| f/(R6 − R7) | 0.31 |
| R4/R3 | 0.22 |
| (R7 + R8)/(R7 − R8) | 1.55 |
| ((CT2 + CT3)/f)*10 | 1.69 |
| CT4/T34 | 3.87 |
| T12/T23 | 0.18 |
| SL/TTL | 0.97 |
| TTL/ImgH | 1.63 |

The detailed optical data of the second embodiment are shown in Table 3, and the aspheric surface data are shown in Table 4 as follows.

TABLE 3

2nd Embodiment f = 3.95 mm, Fno = 2.70, HFOV = 35.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.159 | | | | |
| 2 | Lens 1 | 1.549600 (ASP) | 0.554 | Plastic | 1.544 | 55.9 | 2.79 |
| 3 | | −67.408500 (ASP) | 0.081 | | | | |
| 4 | Lens 2 | 9.724800 (ASP) | 0.389 | Plastic | 1.634 | 23.8 | −4.37 |
| 5 | | 2.124120 (ASP) | 0.447 | | | | |
| 6 | Lens 3 | 5.881600 (ASP) | 0.274 | Plastic | 1.544 | 55.9 | 32.02 |
| 7 | | 8.733600 (ASP) | 0.247 | | | | |
| 8 | Lens 4 | −3.922800 (ASP) | 0.956 | Plastic | 1.544 | 55.9 | 1.80 |
| 9 | | −0.850380 (ASP) | 0.228 | | | | |
| 10 | Lens 5 | −3.073300 (ASP) | 0.425 | Plastic | 1.544 | 55.9 | −1.58 |
| 11 | | 1.247670 (ASP) | 0.500 | | | | |
| 12 | IR-filter | Plano | 0.300 | Glass | 1.517 | 64.2 | — |
| 13 | | Plano | 0.388 | | | | |
| 14 | Image | Plano | — | | | | |

Note:
Reference wavelength (d-line) is 587.6 nm

TABLE 4

| Aspheric Coefficients | | | | | |
|---|---|---|---|---|---|
| Surface # | 2 | 3 | 4 | 5 | 6 |
| k = | −6.50718E+00 | −1.00000E+00 | −3.00000E+01 | 2.71906E+00 | −1.00000E+00 |
| A4 = | 2.12618E−01 | −6.70786E−02 | −8.77823E−02 | −5.65692E−02 | −1.09027E−01 |
| A6 = | −1.78561E−01 | 2.92980E−02 | 4.01880E−02 | 5.46807E−02 | −1.10107E−01 |
| A8 = | 1.19749E−01 | −1.51645E−01 | 1.22280E−01 | 8.43955E−02 | 2.55617E−01 |
| A10 = | −1.34970E−02 | 2.00351E−01 | −6.27034E−01 | −3.21291E−01 | −2.34906E−01 |
| A12 = | −1.12312E−01 | −3.80822E−01 | 8.17078E−01 | 3.93858E−01 | 7.15750E−02 |
| A14 = | −1.73879E−02 | 1.16604E−01 | −4.50001E−01 | −1.79679E−01 | |
| Surface # | 7 | 8 | 9 | 10 | 11 |
| k = | −1.00000E+00 | 6.88778E+00 | −3.61746E+00 | −2.88560E+01 | −1.02E+01 |
| A4 = | −9.93329E−02 | −3.35563E−02 | −1.01825E−01 | −7.49210E−03 | −4.37E−02 |
| A6 = | −9.34643E−02 | 7.52318E−02 | 1.11660E−01 | −2.18455E−02 | 1.08E−02 |
| A8 = | 1.18414E−01 | −1.71310E−01 | −8.79467E−02 | 8.54348E−03 | −4.18E−03 |
| A10 = | −5.48897E−02 | 1.97868E−01 | 4.37681E−02 | −5.48645E−04 | 9.81E−04 |
| A12 = | 4.86253E−03 | −9.53174E−02 | −9.65340E−03 | −1.15113E−04 | −1.26E−04 |
| A14 = | | 1.72238E−02 | 6.55207E−04 | 1.21505E−05 | 7.08E−06 |

Figure 5:
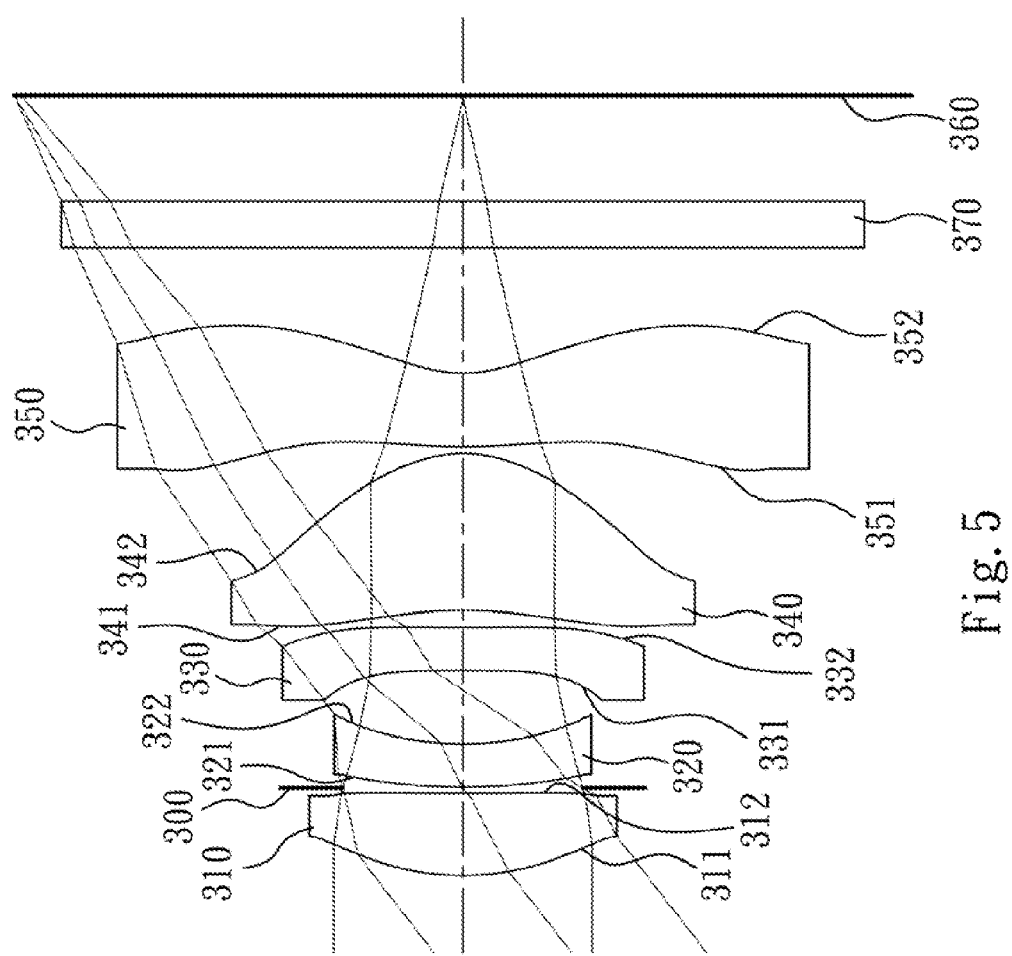
FIG. 5 is a schematic view of a photographing optical lens assembly according to the third embodiment.
Figure 6:
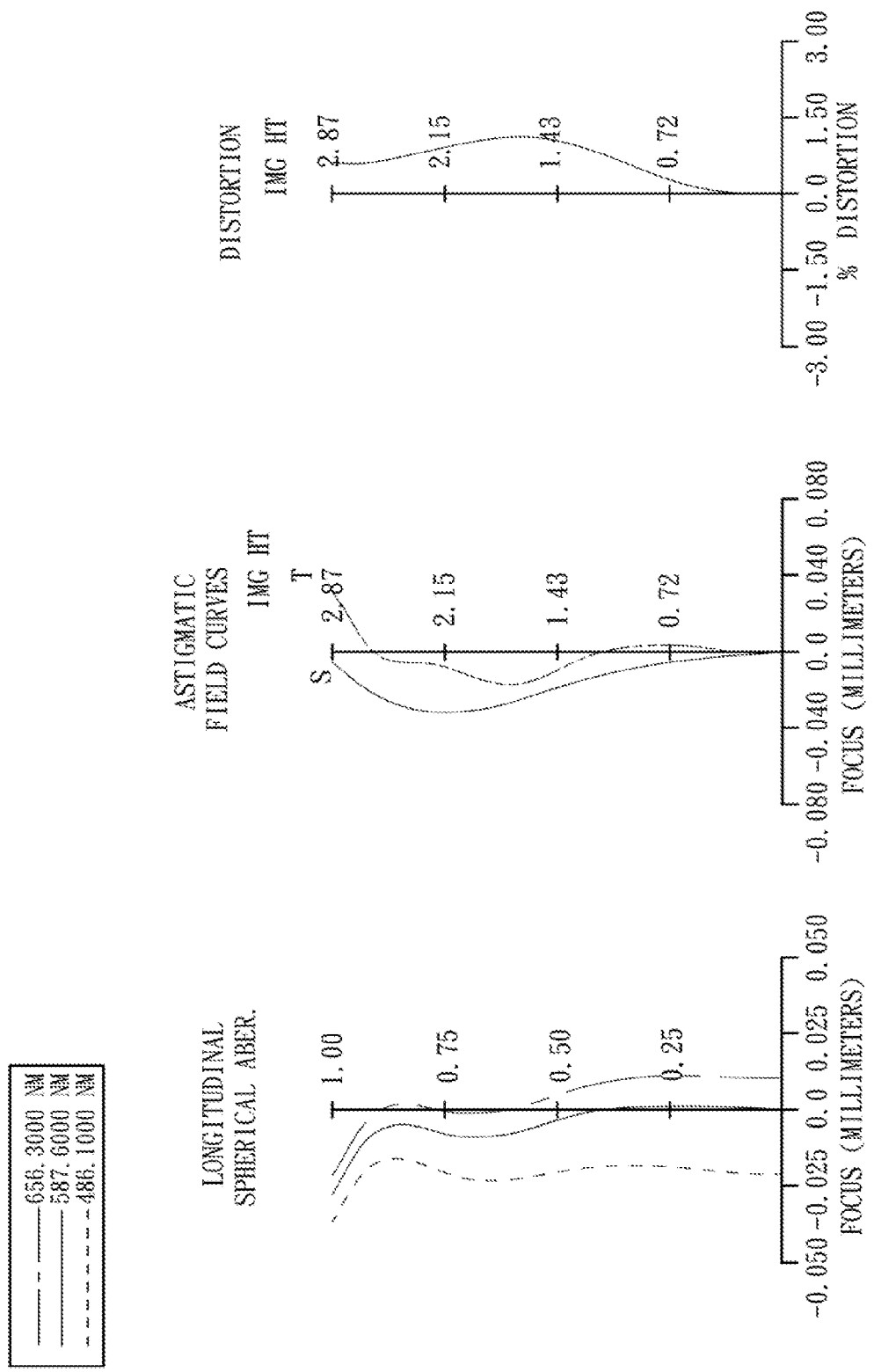
FIG. 6 shows spherical aberration curves, astigmatic field curves and distortion curve of the photographing optical lens assembly according to the third embodiment.

FIG. 5 is a schematic view of a photographing optical lens assembly according to the third embodiment. FIG. 6 shows spherical aberration curves, astigmatic field curves and distortion curve of the photographing optical lens assembly according to the third embodiment. In FIG. 5, the photographing optical lens assembly includes, in order from an object side to an image side, the first lens element 310, an aperture stop 300, the second lens element 320, the third lens element 330, the fourth lens element 340, the fifth lens element 350, an IR (infrared) cut filter 370 and an image plane 360.

The first lens element 310 is made of plastic material. The first lens element 310 with positive refractive power has a convex object-side surface 311 and a concave image-side surface 312. The object-side surface 311 and the image-side surface 312 of the first lens element 310 are aspheric.

The second lens element 320 is made of plastic material. The second lens element 320 with negative refractive power has a convex object-side surface 321 and a concave image-side surface 322. The object-side surface 321 and the image-side surface 322 of the second lens element 320 are aspheric.

The third lens element 330 is made of plastic material. The third lens element 330 with negative refractive power has a concave object-side surface 331 and a concave image-side surface 332. The object-side surface 331 and the image-side surface 332 of the third lens element 330 are aspheric.

The fourth lens element 340 is made of plastic material. The fourth lens element 340 with positive refractive power has a concave object-side surface 341 and a convex image-side surface 342. The object-side surface 341 and the image-side surface 342 of the fourth lens element 340 are aspheric.

The fifth lens element 350 is made of plastic material. The fifth lens element 350 with negative refractive power has a convex object-side surface 351 and a concave image-side surface 352. The object-side surface 351 and the image-side surface 352 of the fifth lens element 350 are aspheric. The fifth lens element 350 has inflection points formed on the image-side surface 352 thereof.

The IR cut filter 370 is made of glass and is located between the fifth lens element 350 and the image plane 360, and will not affect the focal length of the photographing optical lens assembly.

The equation of the aspheric surface profiles of the above lens elements of the third embodiment is the same as that of the first embodiment, and will not be stated herein again.

In the photographing optical lens assembly according to the third embodiment, the definitions of f, Fno, HFOV, V1, V2, f4, f5, R3, R4, R6, R7, R8, CT2, CT3, CT4, T12, T23, T34, SL, TTL and ImgH are the same as those stated in the first embodiment with corresponding values for the third embodiment, and they satisfy the following relationships:

| | |
|---|---|
| f(mm) | 3.71 |
| Fno | 2.27 |
| HFOV(degrees) | 37.6 |
| V1 − V2 | 32.1 |
| f4/f | 0.47 |
| f5/f | −0.57 |
| (f/f4) − (f/f5) | 3.90 |
| f/R3 | 1.04 |
| f/R4 | 1.80 |
| f/(R6 − R7) | 0.09 |
| R4/R3 | 0.58 |
| (R7 + R8)/(R7 − R8) | 1.84 |
| ((CT2 + CT3)/f)*10 | 1.51 |
| CT4/T34 | 9.38 |
| T12/T23 | 0.09 |
| SL/TTL | 0.89 |
| TTL/ImgH | 1.70 |

The detailed optical data of the third embodiment are shown in Table 5, and the aspheric surface data are shown in Table 6 as follows.

TABLE 5

3rd Embodiment
f = 3.71 mm, Fno = 2.27, HFOV = 37.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.722330 (ASP) | 0.522 | Plastic | 1.544 | 55.9 | 3.47 |
| 2 | | 17.439000 (ASP) | 0.035 | | | | |
| 3 | Ape. Stop | Plano | 0.005 | | | | |
| 4 | Lens 2 | 3.572400 (ASP) | 0.280 | Plastic | 1.634 | 23.8 | −8.31 |
| 5 | | 2.064130 (ASP) | 0.466 | | | | |
| 6 | Lens 3 | −22.158900 (ASP) | 0.280 | Plastic | 1.634 | 23.8 | −22.36 |
| 7 | | 39.550200 (ASP) | 0.107 | | | | |
| 8 | Lens 4 | −2.673160 (ASP) | 1.004 | Plastic | 1.544 | 55.9 | 1.74 |
| 9 | | −0.792360 (ASP) | 0.043 | | | | |
| 10 | Lens 5 | 3.964800 (ASP) | 0.474 | Plastic | 1.530 | 55.8 | −2.10 |
| 11 | | 0.832980 (ASP) | 0.800 | | | | |
| 12 | IR-filter | Plano | 0.300 | Glass | 1.517 | 64.2 | — |
| 13 | | Plano | 0.673 | | | | |
| 14 | Image | Plano | — | | | | |

Note:
Reference wavelength (d-line) is 587.6 nm

TABLE 6

Aspheric Coefficients

| Surface # | 1 | 2 | 4 | 5 | 6 |
|---|---|---|---|---|---|
| k = | −9.34714E+00 | −7.39758E+01 | −4.00350E+00 | −1.06945E+01 | 8.34774E+01 |
| A4 = | 2.14267E−01 | −5.78453E−02 | −3.22421E−02 | 1.46641E−01 | −1.45404E−01 |
| A6 = | −2.38722E−01 | 9.51983E−02 | 8.55417E−02 | −1.43860E−01 | −3.37313E−01 |
| A8 = | 2.36266E−01 | −2.62008E−01 | 1.59755E−01 | 3.60806E−01 | 4.70946E−01 |
| A10 = | −2.30972E−01 | 2.35166E−01 | −9.29726E−01 | −4.28931E−01 | −5.84901E−01 |
| A12 = | 1.36699E−01 | −1.30171E−01 | 1.47907E+00 | 2.05872E−01 | 3.49272E−01 |
| A14 = | −6.37420E−02 | 2.59403E−02 | −7.91055E−01 | 3.75938E−02 | |

| Surface # | 7 | 8 | 9 | 10 | 11 |
|---|---|---|---|---|---|
| k = | 8.79978E+00 | 2.75311E+00 | −3.82107E+00 | 1.93095E+00 | −5.90033E+00 |
| A4 = | −1.82212E−02 | 1.30496E−01 | −2.05038E−01 | −1.55578E−01 | −8.53522E−02 |
| A6 = | −1.20186E−01 | 6.45182E−02 | 1.56779E−01 | 3.74929E−02 | 3.26377E−02 |
| A8 = | 4.32936E−02 | −2.34599E−01 | −1.23131E−01 | 3.76657E−04 | −1.03212E−02 |
| A10 = | 2.73759E−02 | 2.76377E−01 | 5.57971E−02 | −2.25675E−03 | 2.26481E−03 |
| A12 = | −1.26625E−02 | −1.43321E−01 | −2.74131E−03 | 5.76331E−04 | −2.96395E−04 |
| A14 = | | 3.07757E−02 | −1.30597E−03 | −5.25924E−05 | 1.77256E−05 |
| A16 = | | −1.05124E−03 | −3.78004E−04 | | |

Figure 7:
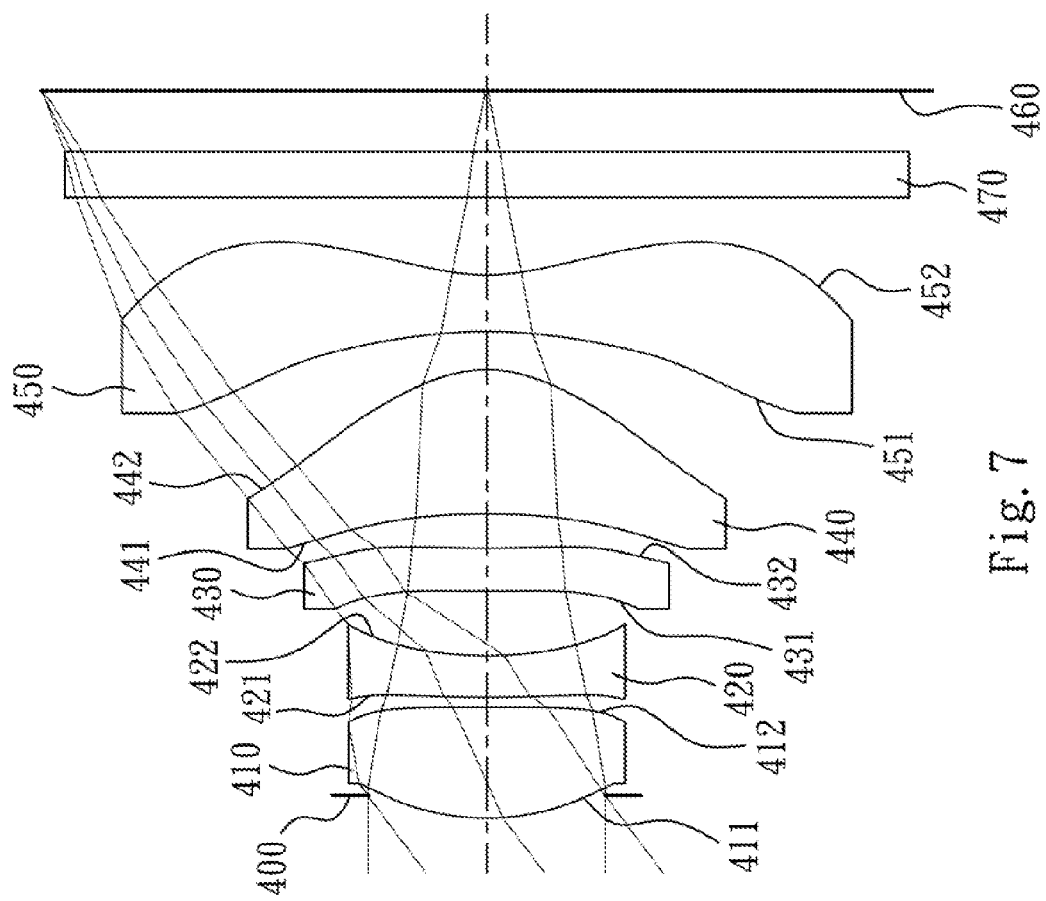
FIG. 7 is a schematic view of a photographing optical lens assembly according to the fourth embodiment.
Figure 8:
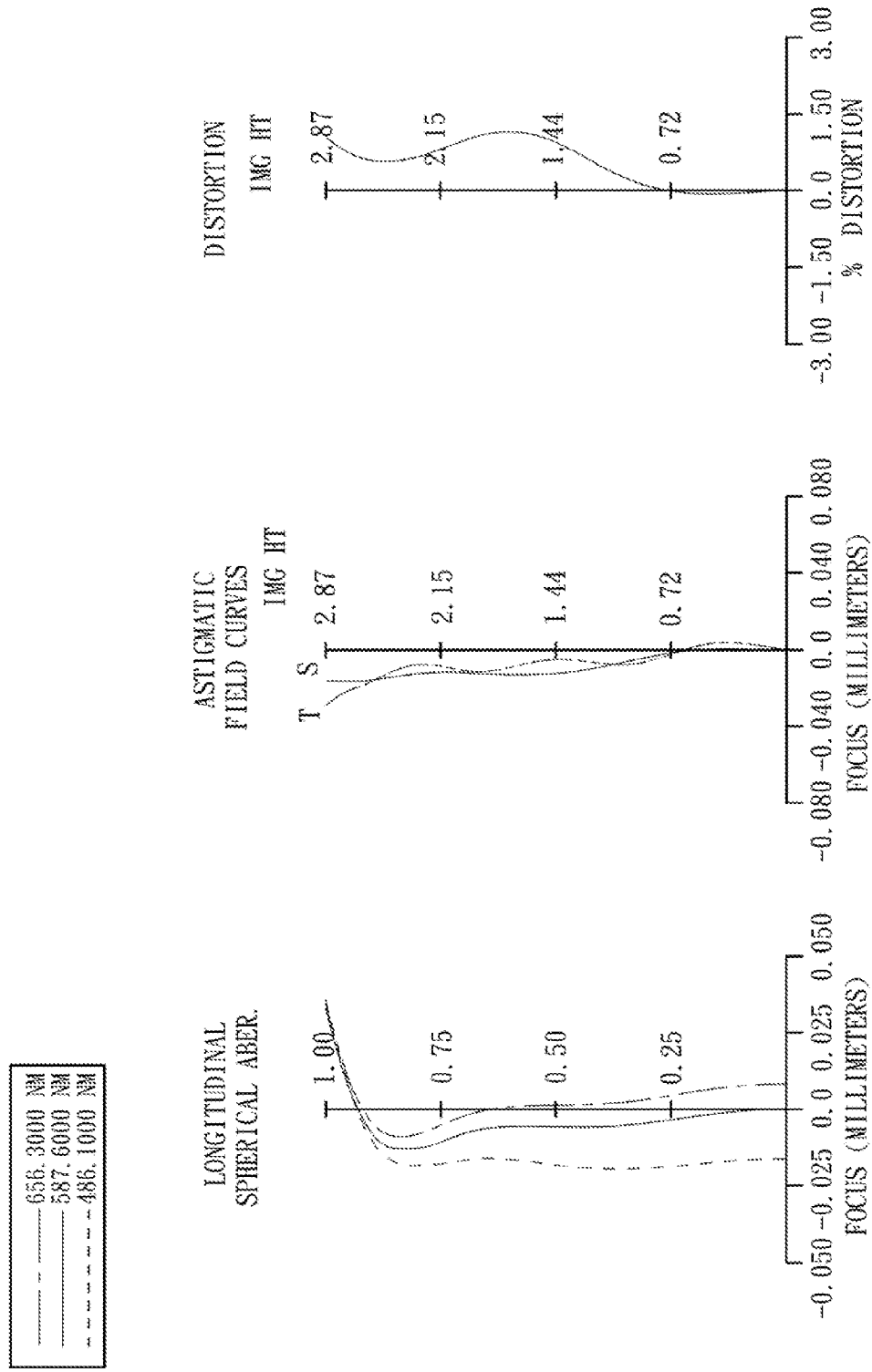
FIG. 8 shows spherical aberration curves, astigmatic field curves and distortion curve of the photographing optical lens assembly according to the fourth embodiment.

FIG. 7 is a schematic view of a photographing optical lens assembly according to the fourth embodiment. FIG. 8 shows spherical aberration curves, astigmatic field curves and distortion curve of the photographing optical lens assembly according to the fourth embodiment. In FIG. 7, the photographing optical lens assembly includes, in order from an object side to an image side, an aperture stop 400, the first lens element 410, the second lens element 420, the third lens element 430, the fourth lens element 440, the fifth lens element 450, an IR (infrared) cut filter 470 and an image plane 460.

The first lens element 410 is made of plastic material. The first lens element 410 with positive refractive power has a convex object-side surface 411 and a concave image-side surface 412. The object-side surface 411 and the image-side surface 412 of the first lens element 410 are aspheric.

The second lens element 420 is made of plastic material. The second lens element 420 with negative refractive power has a convex object-side surface 421 and a concave image-side surface 422. The object-side surface 421 and the image-side surface 422 of the second lens element 420 are aspheric.

The third lens element 430 is made of plastic material. The third lens element 430 with negative refractive power has a convex object-side surface 431 and a concave image-side surface 432. The object-side surface 431 and the image-side surface 432 of the third lens element 430 are aspheric.

The fourth lens element 440 is made of plastic material. The fourth lens element 440 with positive refractive power has a concave object-side surface 441 and a convex image-side surface 442. The object-side surface 441 and the image-side surface 442 of the fourth lens element 440 are aspheric.

The fifth lens element 450 is made of plastic material. The fifth lens element 450 with negative refractive power has a concave object-side surface 451 and a concave image-side surface 452. The object-side surface 451 and the image-side surface 452 of the fifth lens element 450 are aspheric. The fifth lens element 450 has inflection points formed on the image-side surface 452 thereof.

The IR cut filter 470 is made of glass and is located between the fifth lens element 450 and the image plane 460, and will not affect the focal length of the photographing optical lens assembly.

The equation of the aspheric surface profiles of the above lens elements of the fourth embodiment is the same as that of the first embodiment, and will not be stated herein again.

In the photographing optical lens assembly according to the fourth icy embodiment, the definitions of f, Fno, HFOV, V1, V2, f4, f5, R3, R4, R6, R7, R8, CT2, CT3, CT4, T12, T23, T34, SL, TTL and ImgH are the same as those stated in the first embodiment with corresponding values for the fourth embodiment, and they satisfy the following relationships:

| | |
|---|---|
| f(mm) | 3.83 |
| Fno | 2.50 |
| HFOV(degrees) | 36.7 |
| V1 − V2 | 32.1 |
| f4/f | 0.44 |
| f5/f | −0.40 |
| (f/f4) − (f/f5) | 4.77 |
| f/R3 | 0.49 |
| f/R4 | 1.53 |
| f/(R6 − R7) | 0.31 |
| R4/R3 | 0.32 |
| (R7 + R8)/(R7 − R8) | 1.45 |
| ((CT2 + CT3)/f)*10 | 1.41 |
| CT4/T34 | 4.21 |
| T12/T23 | 0.15 |
| SL/TTL | 0.97 |
| TTL/ImgH | 1.60 |

The detailed optical data of the fourth embodiment are shown in Table 7, and the aspheric surface data are shown in Table 8 as follows.

TABLE 7

4th Embodiment
f = 3.83 mm, Fno = 2.50, HFOV = 36.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.142 | Plastic | 1.544 | 55.9 | 2.88 |
| 2 | Lens 1 | 1.555570 (ASP) | 0.715 | | | | |
| 3 | | 185.089900 (ASP) | 0.065 | | | | |
| 4 | Lens 2 | 7.782100 (ASP) | 0.264 | Plastic | 1.634 | 23.8 | −5.91 |
| 5 | | 2.495770 (ASP) | 0.420 | | | | |
| 6 | Lens 3 | 16.179400 (ASP) | 0.274 | Plastic | 1.634 | 23.8 | −24.03 |
| 7 | | 7.794200 (ASP) | 0.221 | | | | |
| 8 | Lens 4 | −4.400000 (ASP) | 0.931 | Plastic | 1.544 | 55.9 | 1.67 |
| 9 | | −0.808170 (ASP) | 0.251 | | | | |
| 10 | Lens 5 | −2.696550 (ASP) | 0.360 | Plastic | 1.544 | 55.9 | −1.54 |
| 11 | | 1.273610 (ASP) | 0.500 | | | | |
| 12 | IR-filter | Plano | 0.300 | Glass | 1.517 | 64.2 | — |
| 13 | | Plano | 0.387 | | | | |
| 14 | Image | Plano | — | | | | |

Note:
Reference wavelength (d-line) is 587.6 nm

TABLE 8

Aspheric Coefficients

| Surface # | 2 | 3 | 4 | 5 | 6 |
|---|---|---|---|---|---|
| k = | −6.34808E+00 | −1.00000E+00 | −3.00000E+01 | 3.54625E+00 | −1.00000E+00 |
| A4 = | 2.04889E−01 | −9.28446E−02 | −7.44003E−02 | −2.82618E−02 | −1.51427E−01 |
| A6 = | −1.93071E−01 | 1.05868E−02 | 1.40144E−02 | 5.64526E−02 | −1.33235E−01 |
| A8 = | 1.58245E−01 | −1.69038E−01 | 1.53899E−01 | 9.21840E−02 | 2.70725E−01 |
| A10 = | −3.38876E−02 | 2.73161E−01 | −6.42903E−01 | −3.21223E−01 | −2.23194E−01 |
| A12 = | −9.76047E−02 | −3.73279E−01 | 8.22179E−01 | 3.98900E−01 | 7.71423E−02 |
| A14 = | −1.73879E−02 | 1.16604E−01 | −4.53058E−01 | −1.76270E−01 | |

| Surface # | 7 | 8 | 9 | 10 | 11 |
|---|---|---|---|---|---|
| k = | −1.00000E+00 | 8.29997E+00 | −3.43965E+00 | −3.00000E+01 | −1.06241E+01 |
| A4 = | −1.11212E−01 | −2.59334E−02 | −1.16410E−01 | −9.97933E−03 | −4.25377E−02 |
| A6 = | −8.89643E−02 | 7.23201E−02 | 1.11922E−01 | −2.24645E−02 | 1.02018E−02 |
| A8 = | 1.22573E−01 | −1.72004E−01 | −8.78633E−02 | 8.48696E−03 | −4.15863E−03 |
| A10 = | −4.73336E−02 | 1.97544E−01 | 4.37268E−02 | −5.46314E−04 | 9.76597E−04 |
| A12 = | 8.02258E−03 | −9.56917E−02 | −9.70494E−03 | −1.14452E−04 | −1.27140E−04 |
| A14 = | | 1.71950E−02 | 6.27870E−04 | 1.29263E−05 | 7.14303E−06 |

Figure 9:
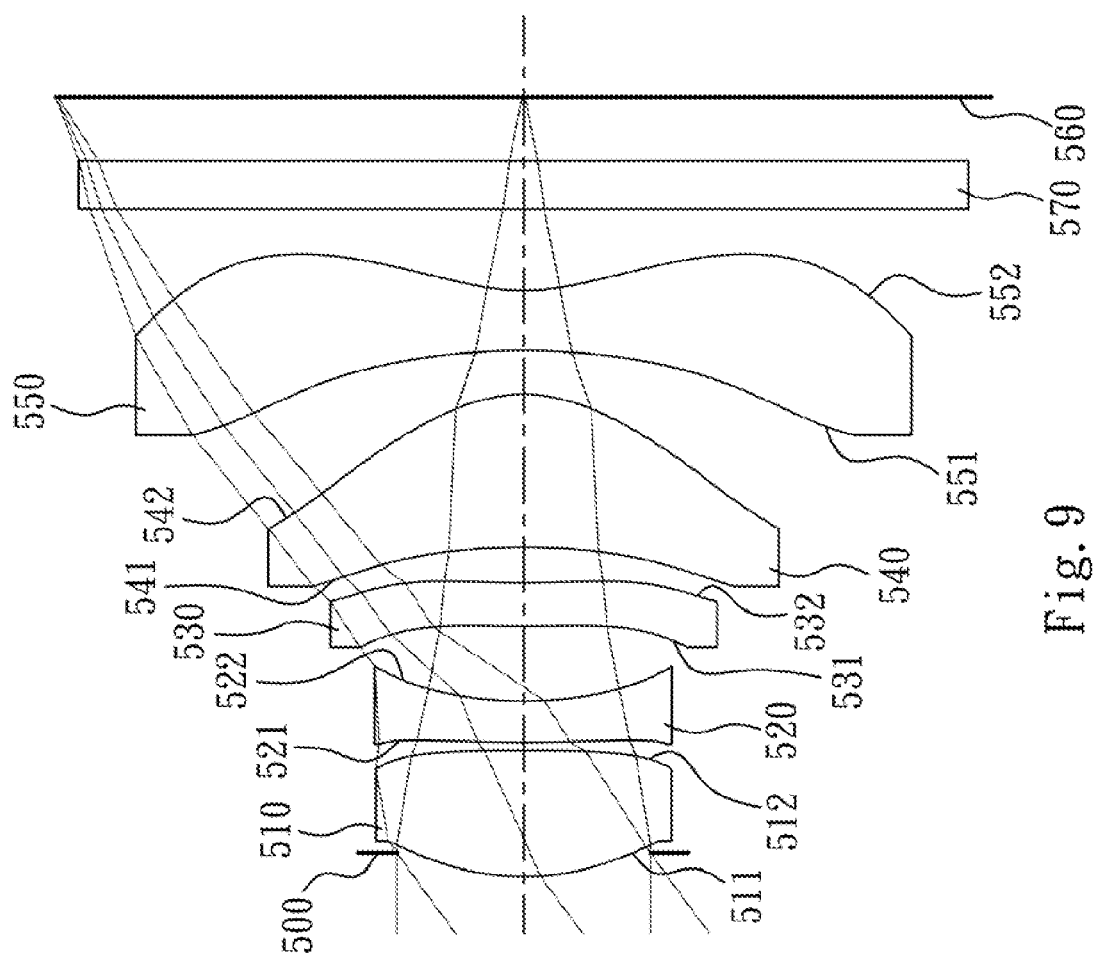
FIG. 9 is a schematic view of a photographing optical lens assembly according to the fifth embodiment.
Figure 10:
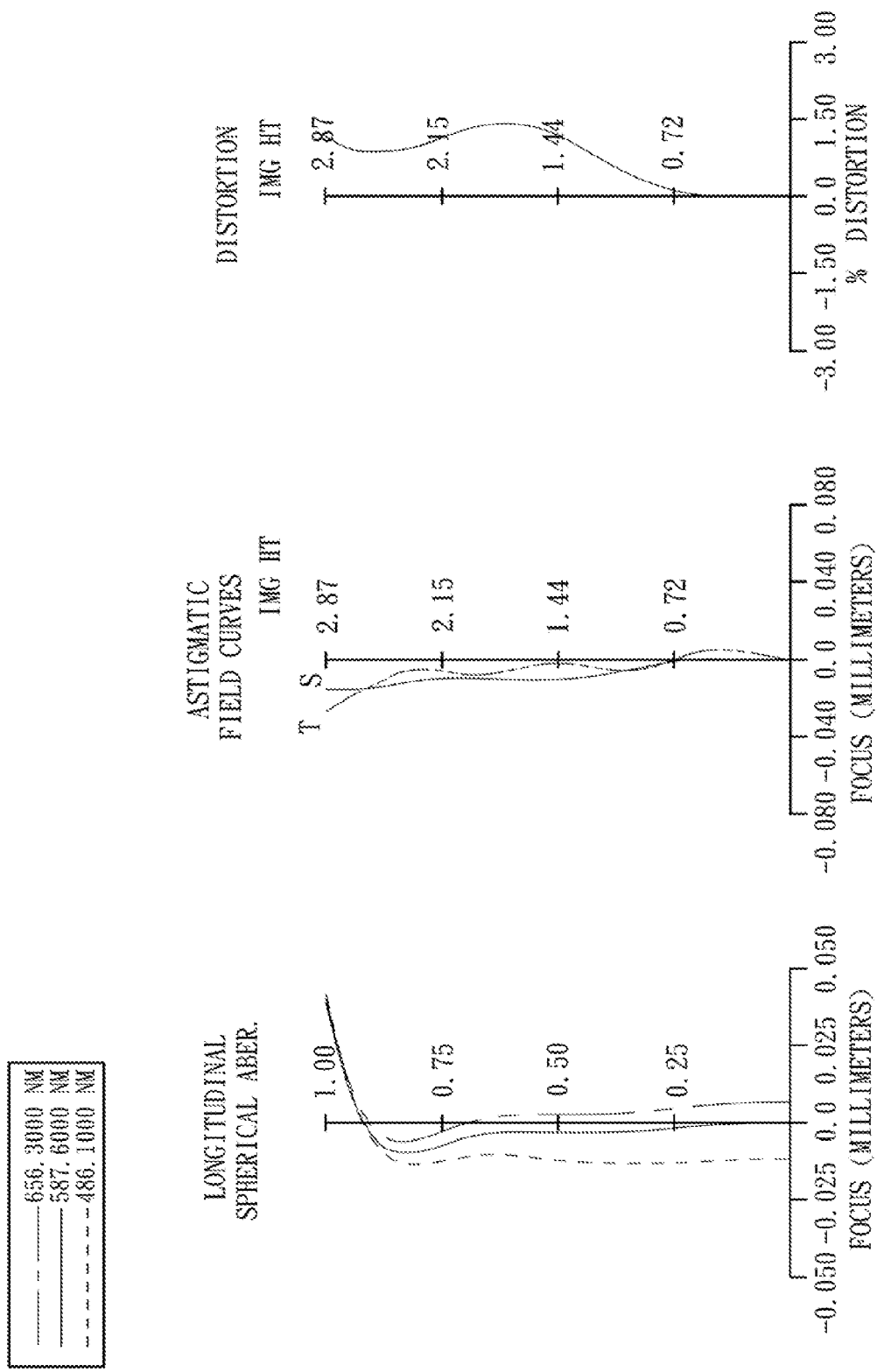
FIG. 10 shows spherical aberration curves, astigmatic field curves and distortion curve of the photographing optical lens assembly according to the fifth embodiment.

FIG. 9 is a schematic view of a photographing optical lens assembly according to the fifth embodiment. FIG. 10 shows spherical aberration curves, astigmatic field curves and distortion curve of the photographing optical lens assembly according to the fifth embodiment. In FIG. 9, the photographing optical lens assembly includes, in order from an object side to an image side, an aperture stop 500, the first lens element 510, the second lens element 520, the third lens element 530, the fourth lens element 540, the fifth lens element 550, an IR (infrared) cut filter 570 and an image plane 560.

The first lens element 510 is made of plastic material. The first lens element 510 with positive refractive power has a convex object-side surface 511 and a convex image-side surface 512. The object-side surface 511 and the image-side surface 512 of the first lens element 510 are aspheric.

The second lens element 520 is made of plastic material. The second lens element 520 with negative refractive power has a convex object-side surface 521 and a concave image-side surface 522. The object-side surface 521 and the image-side surface 522 of the second lens element 520 are aspheric.

The third lens element 530 is made of plastic material. The third lens element 530 with negative refractive power has a convex object-side surface 531 and a concave image-side surface 532. The object-side surface 531 and the image-side surface 532 of the third lens element 530 are aspheric.

The fourth lens element 540 is made of plastic material. The fourth lens element 540 with positive refractive power has a concave object-side surface 541 and a convex image-side surface 542. The object-side surface 541 and the image-side surface 542 of the fourth lens element 540 are aspheric.

The fifth lens element 550 is made of plastic material. The fifth lens element 550 with negative refractive power has a concave object-side surface 551 and a concave image-side surface 552. The object-side surface 551 and the image-side surface 552 of the fifth lens element 550 are aspheric. The fifth lens element 550 has inflection points formed on the image-side surface 552 thereof.

The IR cut filter 570 is made of glass and is located between the fifth lens element 550 and the image plane 560, and will not affect the focal length of the photographing optical lens assembly.

The equation of the aspheric surface profiles of the above lens elements of the fifth embodiment is the same as that of the first embodiment, and will not be stated herein again.

In the photographing optical lens assembly according to the fifth embodiment, the definitions of f, Fno, HFOV, V1, V2, f4, f5, R3, R4, R6, R7, R8, CT2, CT3, CT4, T12, T23, T34, SL, TTL and ImgH are the same as those stated in the first embodiment with corresponding values for the fifth embodiment, and they satisfy the following relationships:

| | |
|---|---|
| f(mm) | 3.91 |
| Fno | 2.50 |
| HFOV(degrees) | 36.1 |
| V1 − V2 | 32.1 |
| f4/f | 0.47 |
| f5/f | −0.43 |
| (f/f4) − (f/f5) | 4.46 |
| f/R3 | 0.40 |

-continued

| | |
|---|---|
| f/R4 | 1.64 |
| f/(R6 − R7) | 0.34 |
| R4/R3 | 0.24 |
| (R7 + R8)/(R7 − R8) | 1.53 |
| ((CT2 + CT3)/f)*10 | 1.32 |
| CT4/T34 | 4.35 |
| T12/T23 | 0.11 |
| SL/TTL | 0.97 |
| TTL/ImgH | 1.63 |

The detailed optical data of the fifth embodiment are shown in Table 9, and the aspheric surface data are shown in Table 10 as follows.

TABLE 9

5th Embodiment f = 3.91 mm, Fno = 2.50, HFOV = 36.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.144 | | | | |
| 2 | Lens 1 | 1.613360 (ASP) | 0.775 | Plastic | 1.544 | 55.9 | 2.73 |
| 3 | | −15.754800 (ASP) | 0.050 | | | | |
| 4 | Lens 2 | 9.724800 (ASP) | 0.251 | Plastic | 1.634 | 23.8 | −5.00 |
| 5 | | 2.368020 (ASP) | 0.463 | | | | |
| 6 | Lens 3 | 12.407200 (ASP) | 0.265 | Plastic | 1.634 | 23.8 | −29.21 |
| 7 | | 7.367800 (ASP) | 0.217 | | | | |
| 8 | Lens 4 | −4.129100 (ASP) | 0.943 | Plastic | 1.544 | 55.9 | 1.82 |
| 9 | | −0.862410 (ASP) | 0.269 | | | | |
| 10 | Lens 5 | −3.729700 (ASP) | 0.368 | Plastic | 1.544 | 55.9 | −1.68 |
| 11 | | 1.254130 (ASP) | 0.500 | | | | |
| 12 | IR-filter | Plano | 0.300 | Glass | 1.517 | 64.2 | — |
| 13 | | Plano | 0.387 | | | | |
| 14 | Image | Plano | — | | | | |

Note:
Reference wavelength (d-line) is 587.6 nm

TABLE 10

Aspheric Coefficients

| Surface # | 2 | 3 | 4 | 5 | 6 |
|---|---|---|---|---|---|
| k = | −6.98559E+00 | −1.00000E+00 | 1.00000E+01 | 3.12806E+00 | −1.00000E+00 |
| A4 = | 2.00182E−01 | −6.34975E−02 | −6.53333E−02 | −4.10735E−02 | −1.54043E−01 |
| A6 = | −1.92603E−01 | 1.35280E−02 | 2.46611E−02 | 5.65293E−02 | −1.29711E−01 |
| A8 = | 1.56684E−01 | −1.71711E−01 | 1.43004E−01 | 8.45788E−02 | 2.53860E−01 |
| A10 = | −4.50091E−02 | 2.85303E−01 | −6.32506E−01 | −3.25802E−01 | −2.23143E−01 |
| A12 = | −5.93417E−02 | −3.51336E−01 | 8.36609E−01 | 4.02487E−01 | 8.58048E−02 |
| A14 = | −1.73795E−02 | 1.05986E−01 | −4.62123E−01 | −1.81497E−01 | |

| Surface # | 7 | 8 | 9 | 10 | 11 |
|---|---|---|---|---|---|
| k = | −1.00000E+00 | 7.13435E+00 | −3.51534E+00 | −2.99889E+01 | −9.93534E+00 |
| A4 = | −1.18735E−01 | −2.10786E−02 | −1.17673E−01 | −9.93844E−03 | −4.34597E−02 |
| A6 = | −8.84036E−02 | 6.56824E−02 | 1.13641E−01 | −2.26513E−02 | 1.05930E−02 |
| A8 = | 1.14246E−01 | −1.71177E−01 | −8.84323E−02 | 8.47034E−03 | −4.19451E−03 |
| A10 = | −4.87758E−02 | 1.98528E−01 | 4.35725E−02 | −5.43249E−04 | 9.79058E−04 |
| A12 = | 1.19387E−02 | −9.55876E−02 | −9.71443E−03 | −1.13709E−04 | −1.26542E−04 |
| A14 = | | 1.70628E−02 | 6.63722E−04 | 1.29413E−05 | 6.99146E−06 |

Figure 11:
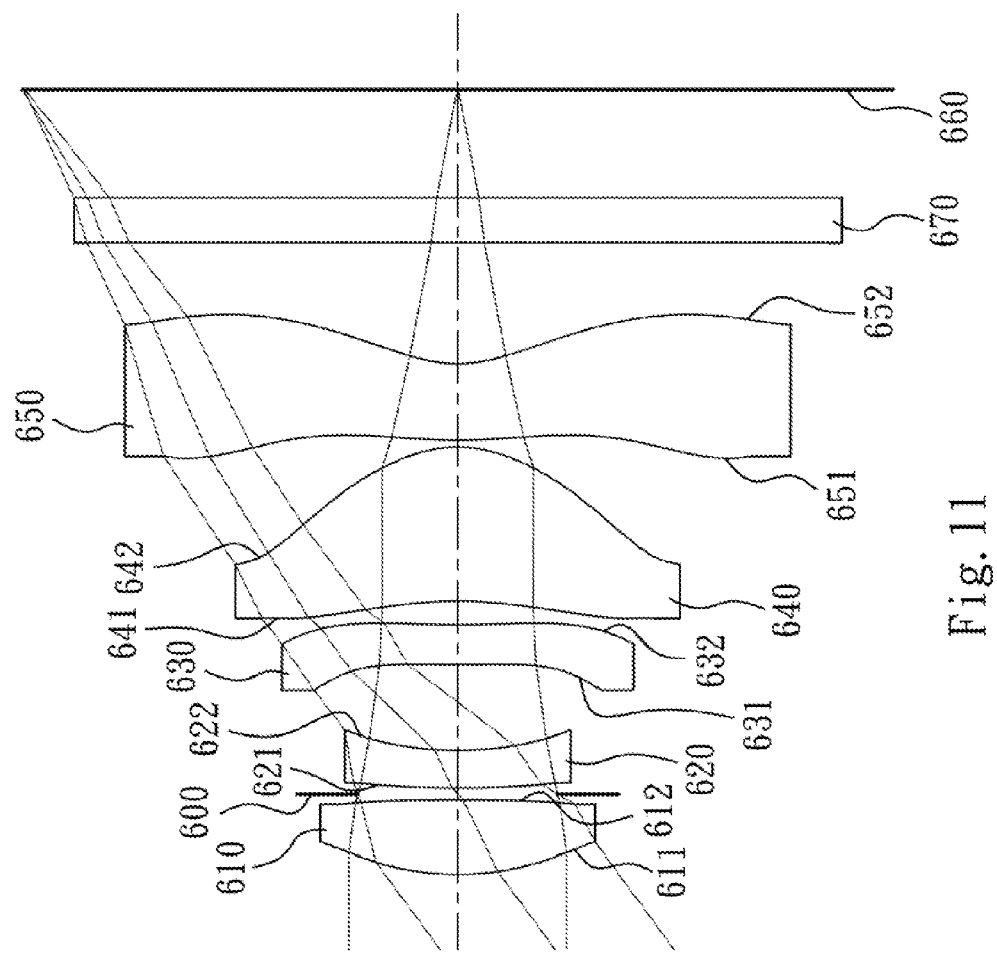
FIG. 11 is a schematic view of a photographing optical lens assembly according to the sixth embodiment.
Figure 12:
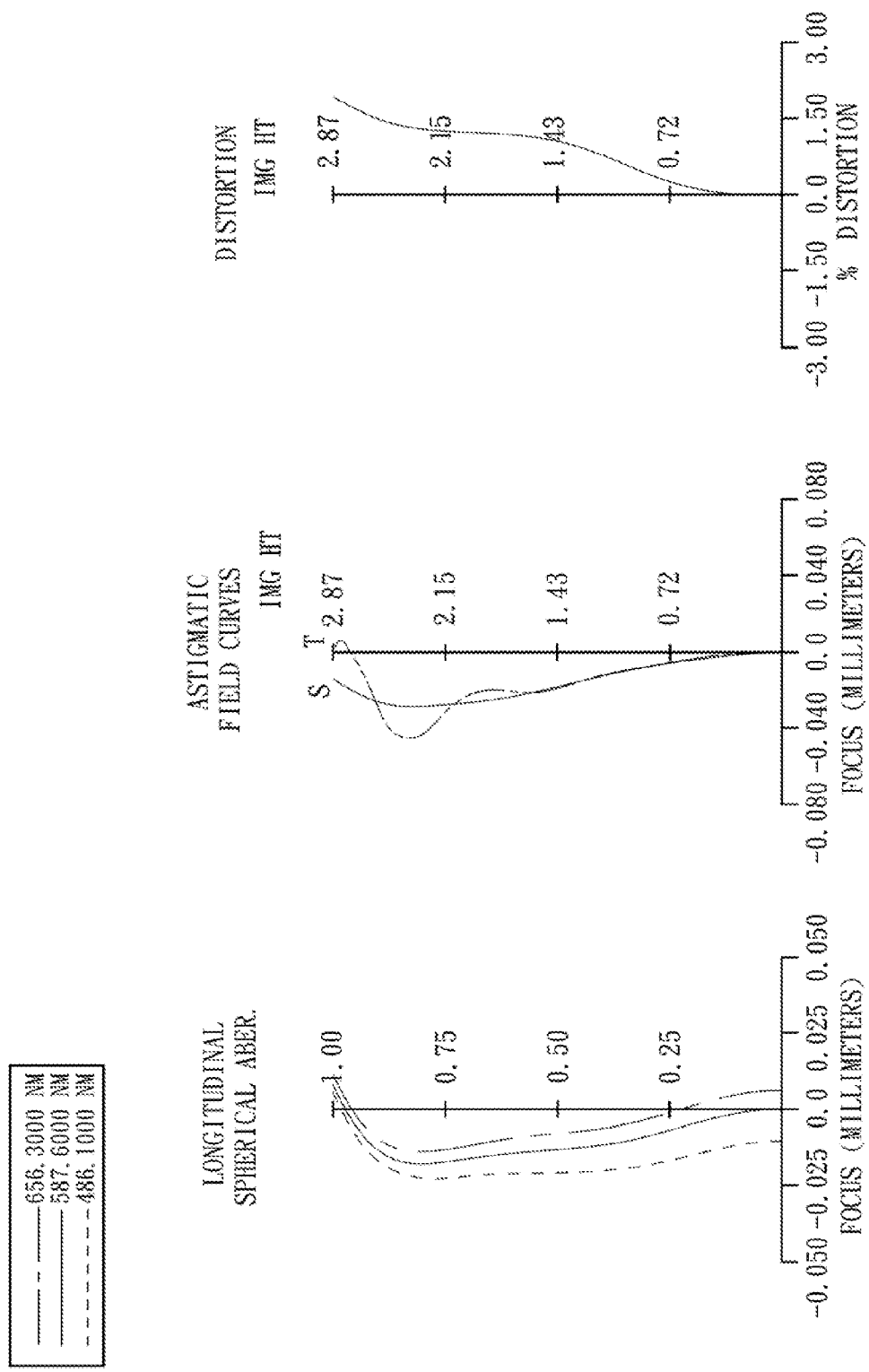
FIG. 12 shows spherical aberration curves, astigmatic field curves and distortion curve of the photographing optical lens assembly according to the sixth embodiment.

FIG. 11 is a schematic view of a photographing optical lens assembly according to the sixth embodiment. FIG. 12 shows spherical aberration curves, astigmatic field curves and distortion curve of the photographing optical lens assembly according to the sixth embodiment. In FIG. 11, the photographing optical lens assembly includes, in order from an object side to an image side, the first lens element 610, an aperture stop 600, the second lens element 620, the third lens element 630, the fourth lens element 640, the fifth lens element 650, an IR (infrared) cut filter 670 and an image plane 660.

The first lens element 610 is made of plastic material. The first lens element 610 with positive refractive power has a convex object-side surface 611 and a convex image-side surface 612. The object-side surface 611 and the image-side surface 612 of the first lens element 610 are aspheric.

The second lens element 620 is made of plastic material. The second lens element 620 with negative refractive power has a convex object-side surface 621 and a concave image-side surface 622. The object-side surface 621 and the image-side surface 622 of the second lens element 620 are aspheric.

The third lens element 630 is made of plastic material. The third lens element 630 with negative refractive power has a convex object-side surface 631 and a concave image-side surface 632. The object-side surface 631 and the image-side surface 632 of the third lens element 630 are aspheric.

The fourth lens element 640 is made of plastic material. The fourth lens element 640 with positive refractive power has a concave object-side surface 641 and a convex image-side surface 642. The object-side surface 641 and the image-side surface 642 of the fourth lens element 640 are aspheric.

The fifth lens element 650 is made of plastic material. The fifth lens element 650 with negative refractive power has a convex object-side surface 651 and a concave image-side surface 652. The object-side surface 651 and the image-side surface 652 of the fifth lens element 650 are aspheric. The fifth lens element 650 has inflection points formed on the image-side surface 652 thereof.

The IR cut filter 670 is made of glass and is located between the fifth lens element 650 and the image plane 660, and will not affect the focal length of the photographing optical lens assembly.

The equation of the aspheric surface profiles of the above lens elements of the sixth embodiment is the same as that of the first embodiment, and will not be stated herein again.

In the photographing optical lens assembly according to the sixth embodiment, the definitions of f, Fno, HFOV, V1, V2, f4, f5, R3, R4, R6, R7, R8, CT2, CT3, CT4, T12, T23, T34, SL, TTL and ImgH are the same as those stated in the first embodiment with corresponding values for the sixth embodiment, and they satisfy the following relationships:

| | |
|---|---|
| f(mm) | 3.87 |
| Fno | 2.70 |
| HFOV(degrees) | 36.1 |
| V1 − V2 | 32.1 |
| f4/f | 0.45 |
| f5/f | −0.53 |
| (f/f4) − (f/f5) | 4.11 |
| f/R3 | 0.64 |
| f/R4 | 1.84 |
| f/(R6 − R7) | 0.32 |
| R4/R3 | 0.35 |
| (R7 + R8)/(R7 − R8) | 1.86 |
| ((CT2 + CT3)/f)*10 | 1.34 |
| CT4/T34 | 6.79 |
| T12/T23 | 0.14 |
| SL/TTL | 0.90 |
| TTL/ImgH | 1.77 |

The detailed optical data of the sixth embodiment are shown in Table 11, and the aspheric surface data are shown in Table 12 as follows.

TABLE 11

6th Embodiment
f = 3.87 mm, Fno = 2.70, HFOV = 36.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.809730 (ASP) | 0.488 | Plastic | 1.544 | 55.9 | 3.06 |
| 2 | | −18.752200 (ASP) | 0.040 | | | | |
| 3 | Ape. Stop | Plano | 0.040 | | | | |
| 4 | Lens 2 | 6.102100 (ASP) | 0.251 | Plastic | 1.634 | 23.8 | −5.21 |
| 5 | | 2.108950 (ASP) | 0.563 | | | | |
| 6 | Lens 3 | 16.666700 (ASP) | 0.270 | Plastic | 1.634 | 23.8 | −36.64 |
| 7 | | 9.643200 (ASP) | 0.150 | | | | |
| 8 | Lens 4 | −2.633310 (ASP) | 1.018 | Plastic | 1.544 | 55.9 | 1.74 |
| 9 | | −0.792740 (ASP) | 0.047 | | | | |
| 10 | Lens 5 | 3.893500 (ASP) | 0.503 | Plastic | 1.530 | 55.8 | −2.05 |
| 11 | | 0.811300 (ASP) | 0.800 | | | | |
| 12 | IR-filter | Plano | 0.300 | Glass | 1.517 | 64.2 | — |
| 13 | | Plano | 0.714 | | | | |
| 14 | Image | Plano | — | | | | |

Note:
Reference wavelength (d-line) is 587.6 nm

TABLE 12

Aspheric Coefficients

| Surface # | 1 | 2 | 4 | 5 | 6 |
|---|---|---|---|---|---|
| k = | −1.00814E+01 | −2.00000E+01 | −2.00000E+01 | −1.64303E+01 | −2.00000E+01 |
| A4 = | 2.04416E−01 | −2.38691E−02 | −5.24537E−02 | 1.39083E−01 | −1.50911E−01 |
| A6 = | −2.41011E−01 | 7.88624E−02 | 1.27090E−01 | −1.35240E−01 | −3.12542E−01 |
| A8 = | 2.52811E−01 | −2.72226E−01 | 1.76677E−01 | 3.48796E−01 | 4.82327E−01 |
| A10 = | −2.48561E−01 | 3.32005E−01 | −1.00041E+00 | −4.50443E−01 | −5.81299E−01 |
| A12 = | 1.37323E−01 | −2.22391E−01 | 1.47912E+00 | 2.51198E−01 | 3.41627E−01 |
| A14 = | −6.43389E−02 | 2.59373E−02 | −7.91046E−01 | 3.75756E−02 | |

| Surface # | 7 | 8 | 9 | 10 | 11 |
|---|---|---|---|---|---|
| k = | −2.00000E+01 | 2.80512E+00 | −3.72246E+00 | 1.85811E+00 | −5.54237E+00 |
| A4 = | −4.05278E−02 | 1.26152E−01 | −1.99930E−01 | −1.54527E−01 | −8.52974E−02 |
| A6 = | −1.22626E−01 | 6.57900E−02 | 1.59827E−01 | 3.76507E−02 | 3.29684E−02 |
| A8 = | 4.28761E−02 | −2.33741E−01 | −1.23029E−01 | 4.17106E−04 | −1.03008E−02 |
| A10 = | 2.63745E−02 | 2.76731E−01 | 5.55971E−02 | −2.25070E−03 | 2.26981E−03 |
| A12 = | −1.37632E−02 | −1.43197E−01 | −2.82115E−03 | 5.75360E−04 | −2.96354E−04 |
| A14 = | | 3.08352E−02 | −1.30948E−03 | −5.35719E−05 | 1.73802E−05 |
| A16 = | | −1.01646E−03 | −3.59550E−04 | | |

Figure 13:
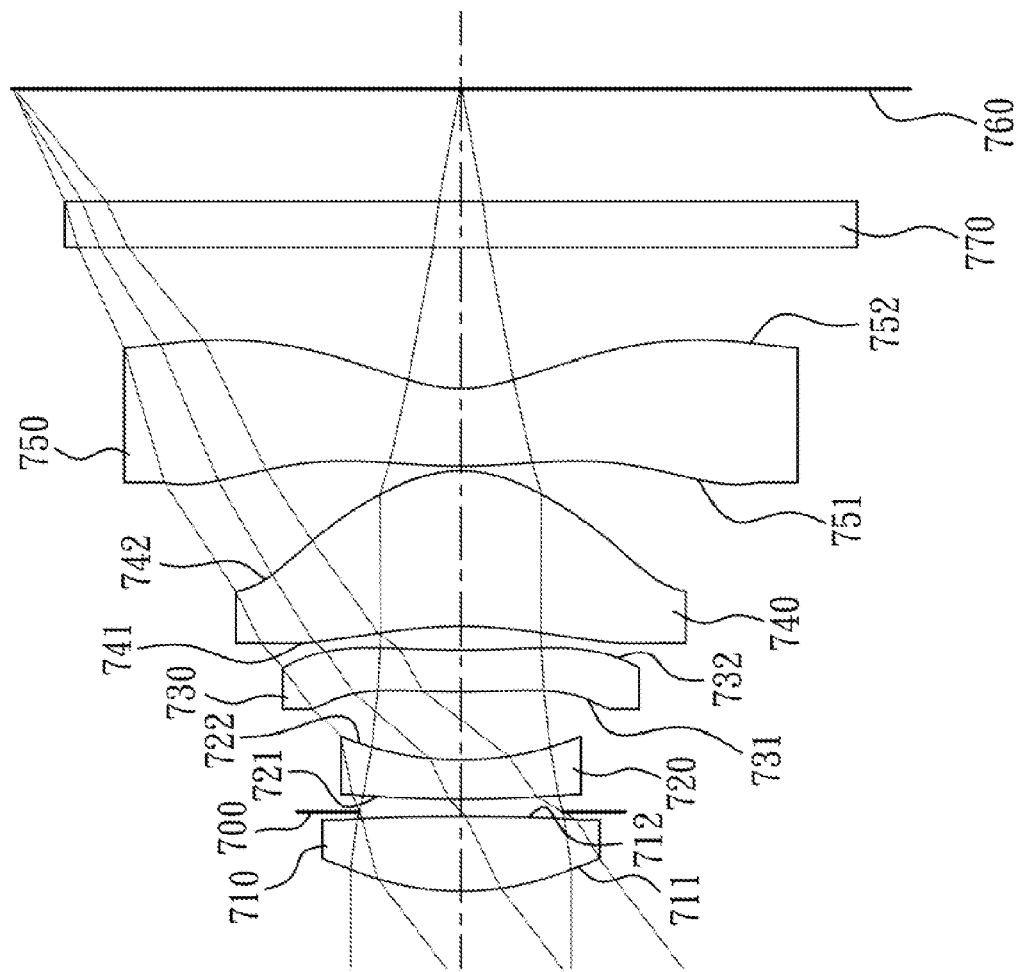
FIG. 13 is a schematic view of a photographing optical lens assembly according to the seventh embodiment.
Figure 14:
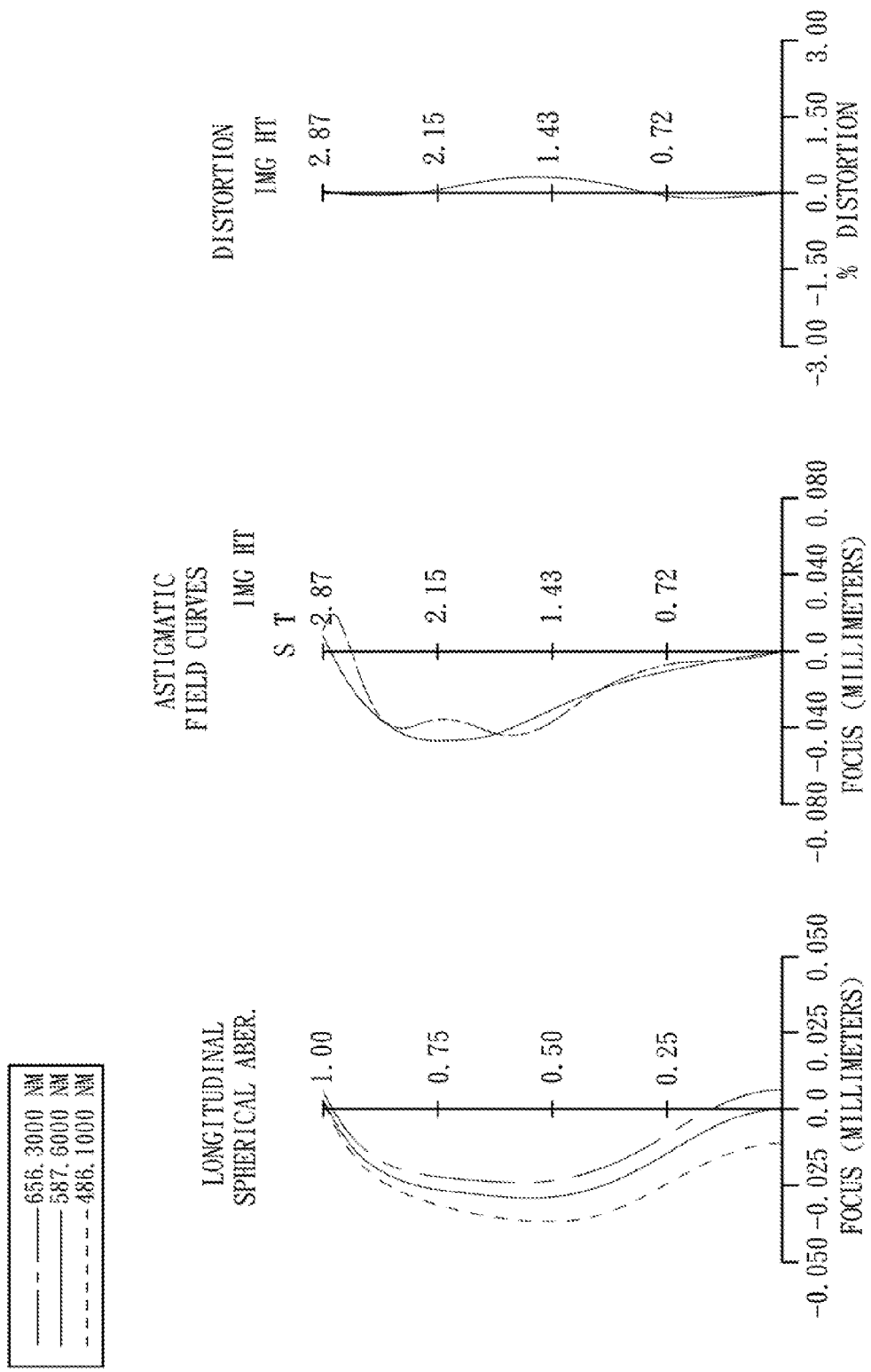
FIG. 14 shows spherical aberration curves, astigmatic field curves and distortion curve of the photographing optical lens assembly according to the seventh embodiment.

FIG. 13 is a schematic view of a photographing optical lens assembly according to the seventh embodiment. FIG. 14 shows spherical aberration curves, astigmatic field curves and distortion curve of the photographing optical lens assembly according to the seventh embodiment. In FIG. 13, the photographing optical lens assembly includes, in order from an object side to an image side, the first lens element 710, an aperture stop 700, the second lens element 720, the third lens element 730, the fourth lens element 740, the fifth lens element 750, an IR (infrared) cut filter 770 and an image plane 760.

The first lens element 710 is made of plastic material. The first lens element 710 with positive refractive power has a convex object-side surface 711 and a convex image-side surface 712. The object-side surface 711 and the image-side surface 712 of the first lens element 710 are aspheric.

The second lens element 720 is made of plastic material. The second lens element 720 with negative refractive power has a convex object-side surface 721 and a concave image-side surface 722. The object-side surface 721 and the image-side surface 722 of the second lens element 720 are aspheric.

The third lens element 730 is made of plastic material. The third lens element 730 with positive refractive power has a convex object-side surface 731 and a concave image-side surface 732. The object-side surface 731 and the image-side surface 732 of the third lens element 730 are aspheric.

The fourth lens element 740 is made of plastic material. The fourth lens element 740 with positive refractive power has a concave object-side surface 741 and a convex image-side surface 742. The object-side surface 741 and the image-side surface 742 of the fourth lens element 740 are aspheric.

The fifth lens element 750 is made of plastic material. The fifth lens element 750 with negative refractive power has a convex object-side surface 751 and a concave image-side surface 752. The object-side surface 751 and the image-side surface 752 of the fifth lens element 750 are aspheric. The fifth lens element 750 has inflection points formed on the image-side surface 752 thereof.

The IR cut filter 770 is made of glass and is located between the fifth lens element 750 and the image plane 760, and will not affect the focal length of the photographing optical lens assembly.

The equation of the aspheric surface profiles of the above lens elements of the seventh embodiment is the same as that of the first embodiment, and will not be stated herein again.

In the photographing optical lens assembly according to the seventh embodiment, the definitions of f, Fno, HFOV, V1, V2, f4, f5, R3, R4, R6, R7, R8, CT2, CT3, CT4, T12, T23, T34, SL, TTL and ImgH are the same as those stated in the first embodiment with corresponding values for the seventh embodiment, and they satisfy the following relationships:

| f(mm) | 3.79 |
|---|---|
| Fno | 2.70 |
| HFOV(degrees) | 37.2 |
| V1 − V2 | 32.1 |
| f4/f | 0.46 |
| f5/f | −0.55 |
| (f/f4) − (f/f5) | 3.97 |
| f/R3 | 0.55 |
| f/R4 | 1.97 |
| f/(R6 − R7) | 0.38 |
| R4/R3 | 0.28 |
| (R7 + R8)/(R7 − R8) | 1.86 |
| ((CT2 + CT3)/f)*10 | 1.38 |
| CT4/T34 | 6.52 |
| T12/T23 | 0.25 |
| SL/TTL | 0.90 |
| TTL/ImgH | 1.75 |

The detailed optical data of the seventh embodiment are shown in Table 13, and the aspheric surface data are shown in Table 14 as follows.

TABLE 13

7th Embodiment
f = 3.79 mm, Fno = 2.70, HFOV = 37.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.823030 (ASP) | 0.475 | Plastic | 1.544 | 55.9 | 3.09 |

TABLE 13-continued

7th Embodiment
f = 3.79 mm, Fno = 2.70, HFOV = 37.2 deg.

| Surface # | | Curvature Radius | Thickness | Material | Index | Abbe # | Focal length |
|---|---|---|---|---|---|---|---|
| 2 | | −19.645400 (ASP) | 0.030 | | | | |
| 3 | Ape. Stop | Plano | 0.080 | | | | |
| 4 | Lens 2 | 6.965400 (ASP) | 0.255 | Plastic | 1.634 | 23.8 | −4.31 |
| 5 | | 1.934590 (ASP) | 0.433 | | | | |
| 6 | Lens 3 | 6.135800 (ASP) | 0.271 | Plastic | 1.634 | 23.8 | 54.72 |
| 7 | | 7.326500 (ASP) | 0.152 | | | | |
| 8 | Lens 4 | −2.630540 (ASP) | 0.991 | Plastic | 1.544 | 55.9 | 1.75 |
| 9 | | −0.793090 (ASP) | 0.031 | | | | |
| 10 | Lens 5 | 3.885400 (ASP) | 0.499 | Plastic | 1.530 | 55.8 | −2.11 |
| 11 | | 0.829740 (ASP) | 0.900 | | | | |
| 12 | IR-filter | Plano | 0.300 | Glass | 1.517 | 64.2 | — |
| 13 | | Plano | 0.716 | | | | |
| 14 | Image | Plano | — | | | | |

Note:
Reference wavelength (d-line) is 587.6 nm

TABLE 14

Aspheric Coefficients

| Surface # | 1 | 2 | 4 | 5 | 6 |
|---|---|---|---|---|---|
| k = | −1.01944E+01 | −2.00000E+01 | −2.00000E+01 | −1.47543E+01 | −6.06442E−01 |
| A4 = | 2.04251E−01 | −2.06573E−02 | −6.20150E−02 | 1.44933E−01 | −1.48852E−01 |
| A6 = | −2.40080E−01 | 7.85366E−02 | 1.22966E−01 | −1.31172E−01 | −3.05005E−01 |
| A8 = | 2.54659E−01 | −2.75399E−01 | 1.76597E−01 | 3.47202E−01 | 4.85997E−01 |
| A10 = | −2.46870E−01 | 3.27739E−01 | −1.01540E+00 | −4.61780E−01 | −5.80142E−01 |
| A12 = | 1.36521E−01 | −2.18710E−01 | 1.47707E+00 | 2.32277E−01 | 3.41627E−01 |
| A14 = | −7.02008E−02 | 2.59372E−02 | −7.91047E−01 | 3.75776E−02 | |

| Surface # | 7 | 8 | 9 | 10 | 11 |
|---|---|---|---|---|---|
| k = | −1.65129E+01 | 2.79943E+00 | −3.84277E+00 | 1.87233E+00 | −6.03824E+00 |
| A4 = | −4.32391E−02 | 1.27236E−01 | −2.00640E−01 | −1.54438E−01 | −8.41731E−02 |
| A6 = | −1.26300E−01 | 6.59765E−02 | 1.59516E−01 | 3.76780E−02 | 3.30722E−02 |
| A8 = | 4.16264E−02 | −2.33818E−01 | −1.23149E−01 | 4.23956E−04 | −1.02952E−02 |
| A10 = | 2.60717E−02 | 2.76645E−01 | 5.55522E−02 | −2.24912E−03 | 2.26991E−03 |
| A12 = | −1.37101E−02 | −1.43243E−01 | −2.83739E−03 | 5.75723E−04 | −2.96398E−04 |
| A14 = | | 3.08179E−02 | −1.31564E−03 | −5.34863E−05 | 1.73712E−05 |
| A16 = | | −1.01797E−03 | −3.62035E−04 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A photographing optical lens assembly comprising, in order from an object side to an image side:
   a first lens element with positive refractive power;
   a second lens element with negative refractive power having a convex object-side surface and a concave image-side surface;
   a third lens element having a concave image-side surface, wherein at least one of an object-side surface and the concave image-side surface of the third lens element is aspheric;
   a fourth lens element with positive refractive power having a convex image-side surface, wherein at least one of an object-side surface and the convex image-side surface of the fourth lens element is aspheric; and
   a fifth lens element with negative refractive power having a concave image-side surface, wherein at least one of an object-side surface and the concave image-side surface of the fifth lens element is aspheric;
   wherein a focal length of the fourth lens element is f4, a focal length of the photographing optical lens assembly is f, a curvature radius of the object-side surface of the second lens element is R3, a curvature radius of the image-side surface of the third lens element is R6, a curvature radius of the object-side surface of the fourth lens element is R7, and they satisfy the following relationships:

$0.3 < f4/f < 0.8;$ $0.3 < f/R3 < 2.0;$ and $0.0 < f/(R6-R7) < 0.5.$

2. The photographing optical lens assembly of claim 1, wherein at least one of the object-side surface and the image-side surface of the second lens element is aspheric, and the fifth lens element has at least one inflection point formed on at least one of the object-side surface and the image-side surface thereof.

3. The photographing optical lens assembly of claim 2, wherein the Abbe number of the first lens element is V1, the Abbe number of the second lens to element is V2, and they satisfy the following relationship:

$$26 < V1-V2 < 40.$$

4. The photographing optical lens assembly of claim 3, wherein the third lens element is with negative refractive power, and the fifth lens element is made of plastic material.

5. The photographing optical lens assembly of claim 3, wherein the curvature radius of the object-side surface of the fourth lens element is R7, a curvature radius of the image-side surface of the fourth lens element is R8, and they satisfy the following relationship:

$$1.5 < (R7+R8)/(R7-R8) < 2.2.$$

6. The photographing optical lens assembly of claim 5, wherein the focal length of the fourth lens element is f4, the focal length of the photographing optical lens assembly is f, and they satisfy the following relationship:

$$0.3 < f4/f < 0.55.$$

7. The photographing optical lens assembly of claim 6, wherein an axial distance between the first lens element and the second lens element is T12, an axial distance between the second lens element and the third lens element is T23, and they satisfy the following relationship:

$$0.0 < T12/T23 < 0.5.$$

8. The photographing optical lens assembly of claim 5, wherein a focal length of the fifth lens element is f5, the focal length of the photographing optical lens assembly is f, and they satisfy the following relationship:

$$-0.6 < f5/f < -0.25.$$

9. The photographing optical lens assembly of claim 1, further comprising:
a stop, an axial distance between the stop and the image plane is SL, an axial distance between the object-side surface of the first lens element and the image plane is TTL, and they satisfy the following relationship:

$$0.7 < SL/TTL < 1.1.$$

10. The photographing optical lens assembly of claim 9, wherein a thickness near the optical axis of the fourth lens element is CT4, an axial distance between the third lens element and the fourth lens element is T34, and they satisfy the following relationship:

$$3.2 < CT4/T34 < 12.5.$$

11. The photographing optical lens assembly of claim 1, further comprising:
an image sensor located on the image plane, wherein a half of a diagonal length of an effective photosensitive area of the image sensor is ImgH, and the axial distance between the object-side surface of the first lens element and the image plane is TTL, and they satisfy the following relationship:

$$TTL/ImgH < 1.85.$$

12. The photographing optical lens assembly of claim 1, wherein the focal length of the photographing optical lens assembly is f, the focal length of the fourth lens element is f4, a focal length of the fifth lens element is f5, and they satisfy the following relationship:

$$3.0 < (f/f4)-(f/f5) < 6.0.$$

13. A photographing optical lens assembly comprising, in order from an object side to an image side:
a first lens element with positive refractive power;
a second lens element with negative refractive power having a concave image-side surface;
a third lens element having a concave image-side surface, wherein at least one of an object-side surface and the image-side surface of the third lens element is aspheric;
a fourth lens element with positive refractive power having a convex image-side surface, wherein at least one of an object-side surface and the image-side surface of the fourth lens element is aspheric; and
a fifth lens element with negative refractive power having a concave image-side surface, wherein at least one of an object-side surface and the image-side surface of the fifth lens element is aspheric;
wherein a focal length of the fourth lens element is f4, a focal length of the photographing optical lens assembly is f, a curvature radius of the image-side surface of the second lens element is R4, a curvature radius of the object-side surface of the fourth lens element is R7, a curvature radius of the image-side surface of the fourth lens element is R8, a thickness near the optical axis of the fourth lens element is CT4, an axial distance between the third lens element and the fourth lens element is T34, and they satisfy the following relationships:

$$0.3 < f4/f < 0.8;$$

$$1.3 < f/R4 < 3.8;$$

$$1.4 < (R7+R8)/(R7-R8) < 3.0;\text{ and}$$

$$1.6 < CT4/T34 < 18.0.$$

14. The photographing optical lens assembly of claim 13, wherein the object-side surface and the image-side surface of the fourth lens element are aspheric, and the fifth lens element has at least one inflection point formed on at least one of the object-side surface and the image-side surface thereof.

15. The photographing optical lens assembly of claim 14, wherein a thickness near the optical axis of the second lens element is CT2, a thickness near the optical axis of the third lens element is CT3, the focal length of the photographing optical lens assembly is f, and they satisfy the following relationship:

$$0.8 < ((CT2+CT3)/f)*10 < 2.0.$$

16. The photographing optical lens assembly of claim 15, wherein the curvature radius of the object-side surface of the fourth lens element is R7, the curvature radius of the image-side surface of the fourth lens element is R8, and they satisfy the following relationship:

$$1.5 < (R7+R8)/(R7-R8) < 2.2.$$

17. The photographing optical lens assembly of claim 14, wherein the focal length of the photographing optical lens assembly is f, a curvature radius of the object-side surface of the second lens element is R3, and they satisfy the following relationship:

$$0.35 < f/R3 < 1.5.$$

18. The photographing optical lens assembly of claim 14, wherein a thickness near the optical axis of the fourth lens element is CT4, an axial distance between the third lens element and the fourth lens element is T34, and they satisfy the following relationship:

$$3.2 < CT4/T34 < 12.5.$$

19. The photographing optical lens assembly of claim 13, wherein the third lens element is with negative refractive power, and the fifth lens element is made of plastic material.

20. The photographing optical lens assembly of claim 13, further comprising:
   a stop, an axial distance between the stop and the image plane is SL, an axial distance between the object-side surface of the first lens element and the image plane is TTL, and they satisfy the following relationship:

$0.7 < SL/TTL < 1.1.$

21. The photographing optical lens assembly of claim 20, wherein the curvature radius of the object-side surface of the second lens element is R3, the curvature radius of the image-side surface of the second lens element is R4, and they satisfy the following relationship:

$0.0 < R4/R3 < 0.5.$

22. The photographing optical lens assembly of claim 13, wherein the focal length of the photographing optical lens assembly is f, a curvature radius of the image-side surface of the third lens element is R6, the curvature radius of the object-side surface of the fourth lens element is R7, and they satisfy the following relationship:

$0.0 < f/(R6-R7) < 0.5.$

* * * * *